United States Patent [19]

Ogawa

[11] Patent Number: 5,537,259
[45] Date of Patent: Jul. 16, 1996

[54] ZOOM LENS

[75] Inventor: Hideki Ogawa, Tokyo, Japan

[73] Assignee: Canon Kabushiki Kaisha, Tokyo, Japan

[21] Appl. No.: 426,171

[22] Filed: Apr. 21, 1995

[30] Foreign Application Priority Data

Apr. 26, 1994 [JP] Japan ................................ 6-088491

[51] Int. Cl.⁶ ................................................ G02B 15/14
[52] U.S. Cl. ........................................ 359/684; 359/689
[58] Field of Search .................................. 359/683, 684, 359/689

[56] References Cited

U.S. PATENT DOCUMENTS

| | | | |
|---|---|---|---|
| 4,871,243 | 10/1989 | Ogawa et al. | 359/693 |
| 5,002,373 | 3/1991 | Yamanashi | 359/689 |
| 5,321,552 | 6/1994 | Horiuchi et al. | 359/684 |
| 5,325,233 | 6/1994 | Nakatsuji et al. | 359/683 |
| 5,402,268 | 3/1995 | Tatsuno | 359/686 |
| 5,414,562 | 5/1995 | Ueda | 359/676 |

FOREIGN PATENT DOCUMENTS

| | | |
|---|---|---|
| 61-53696 | 11/1986 | Japan . |
| 62-108218 | 5/1987 | Japan . |
| 64-39542 | 2/1989 | Japan . |
| 1-20544 | 5/1989 | Japan . |
| 1-25043 | 5/1989 | Japan . |
| 4338910 | 11/1992 | Japan ................................ 359/689 |

*Primary Examiner*—Georgia Y. Epps
*Assistant Examiner*—Evelyn A. Lester
*Attorney, Agent, or Firm*—Fitzpatrick, Cella, Harper & Scinto

[57] ABSTRACT

A zoom lens includes at least a first lens group having a positive refracting power, a second lens group having a positive refracting power, and a third lens group having a negative refracting power in this order from the object side. Such zoom lens performs zooming by varying the distance between respective lens groups. Zooming from the wide angle end to the telephoto end is performed by moving the second and third lens groups toward the image plane side at different speeds, and focusing is performed by moving the second lens group. Various optical conditions are satisfied in the zoom lens.

5 Claims, 25 Drawing Sheets

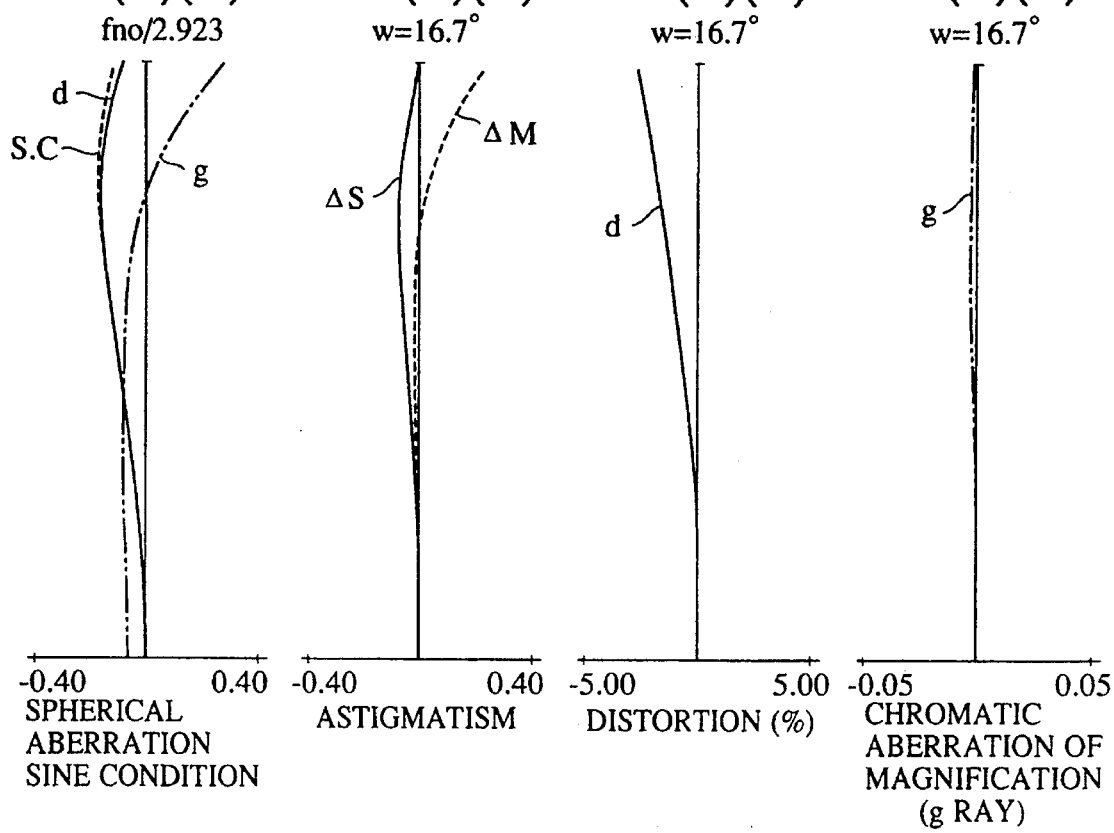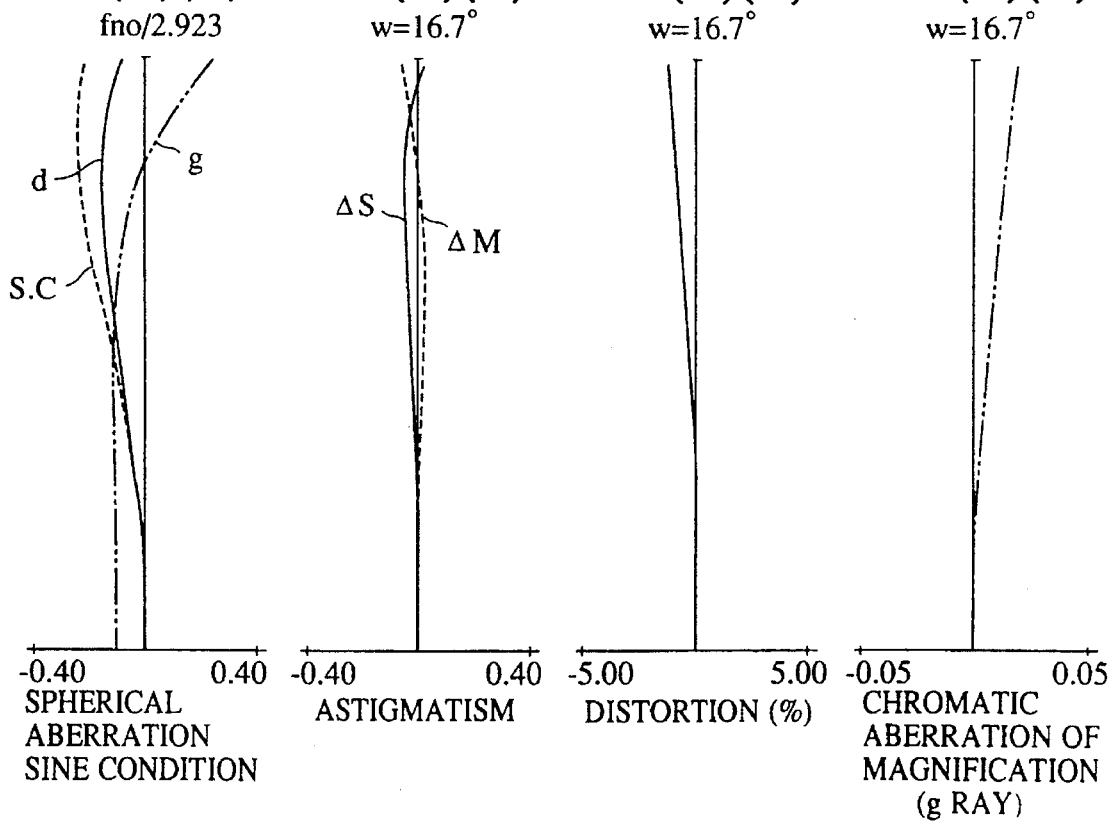

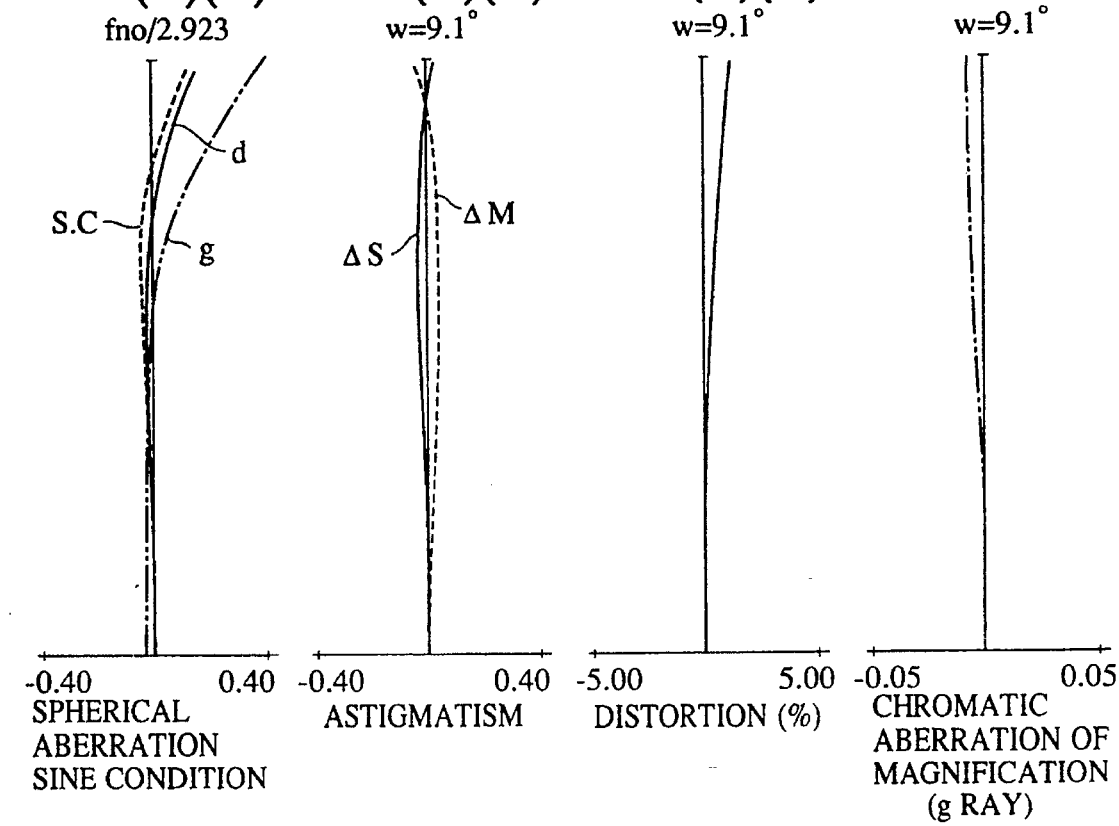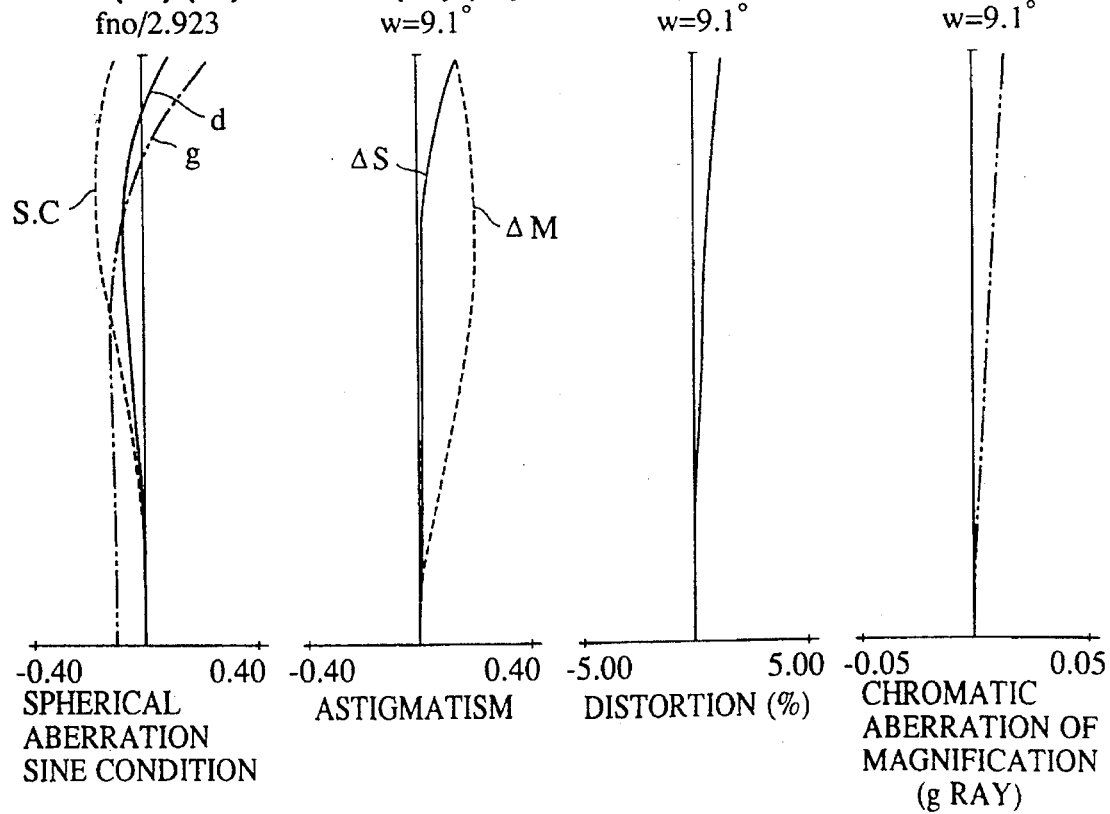

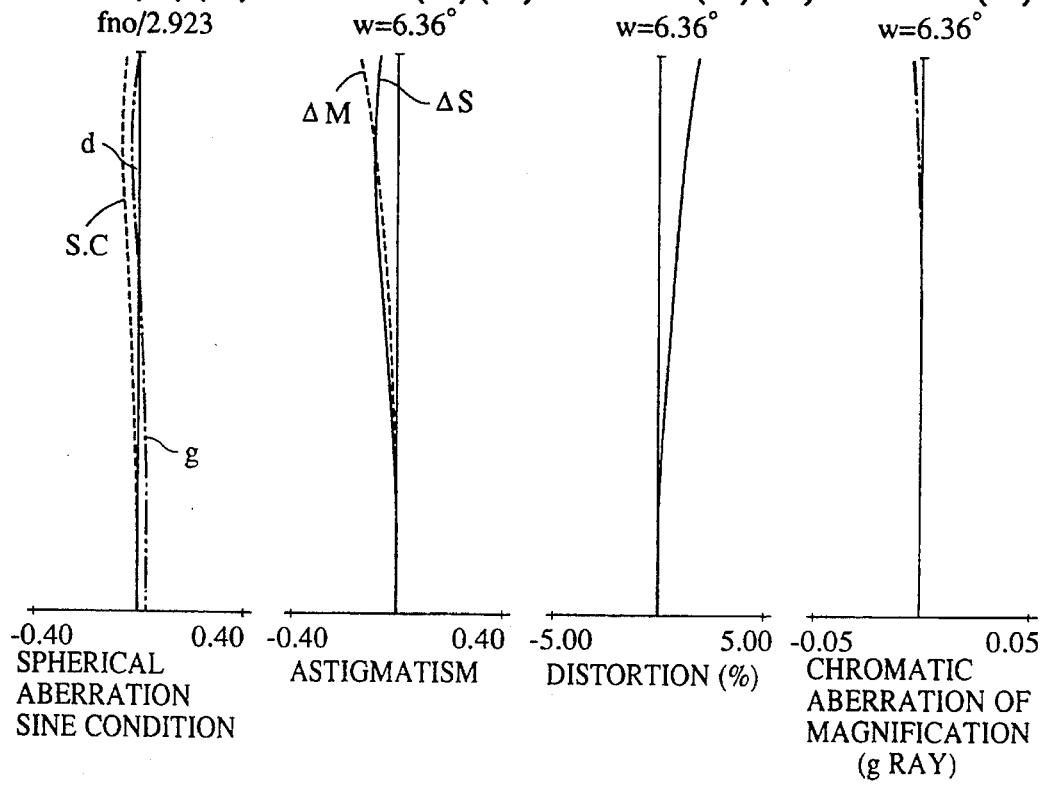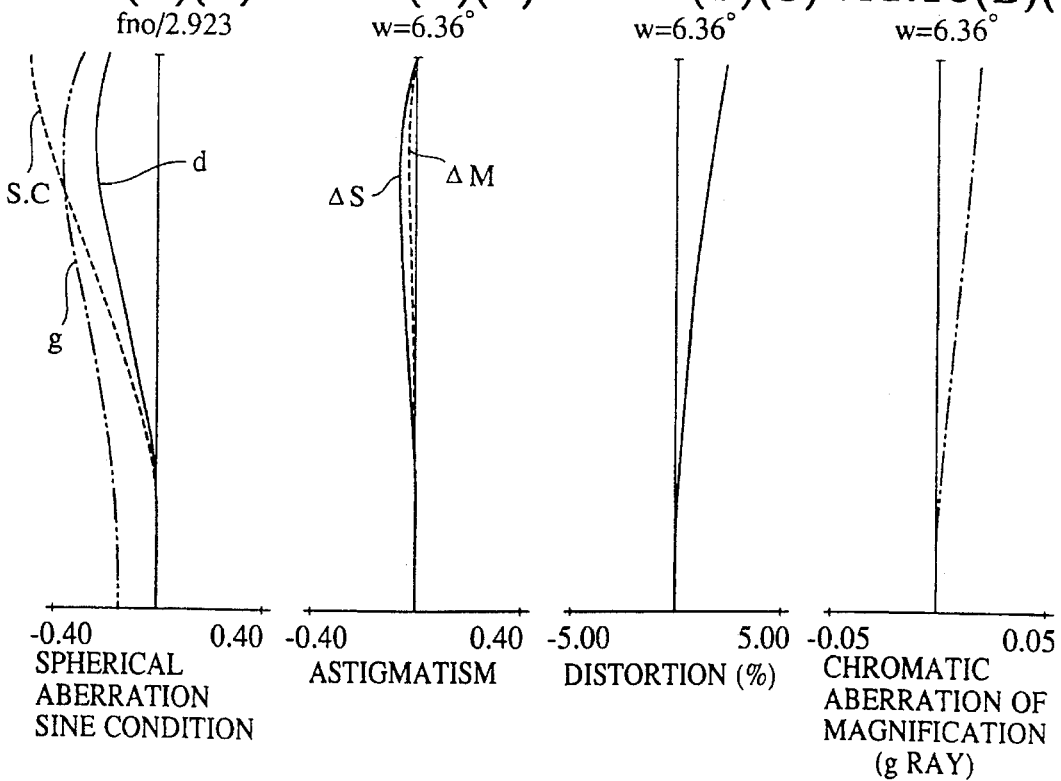

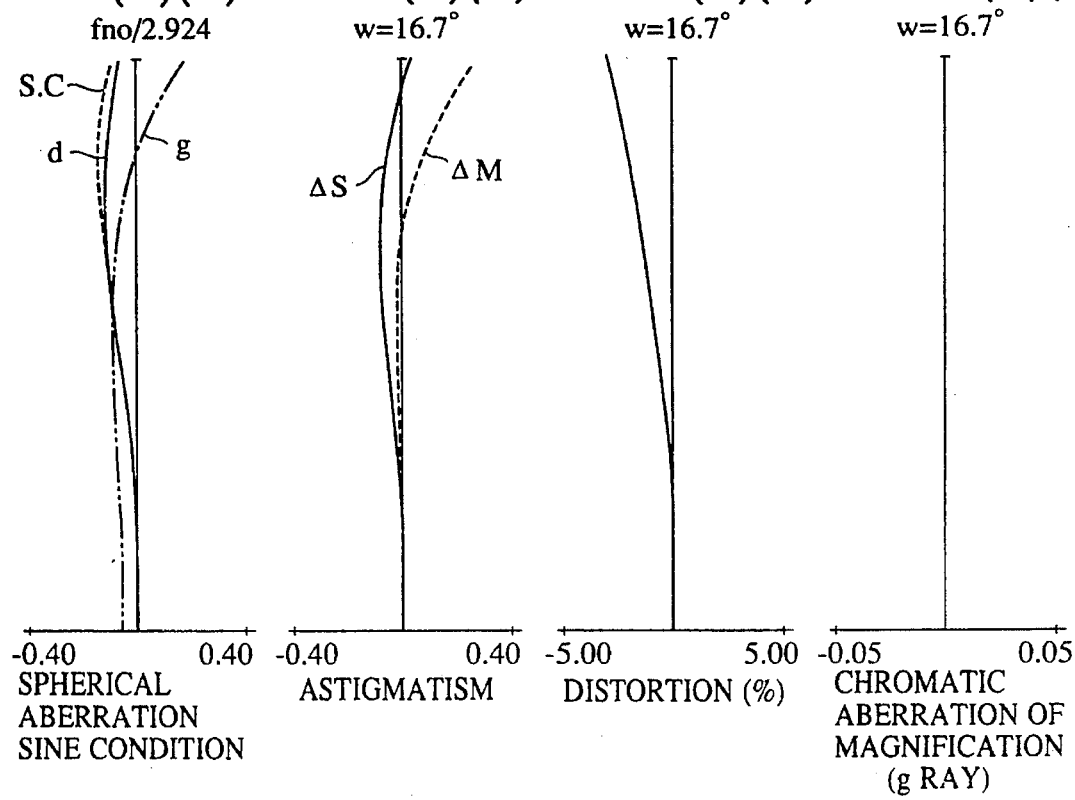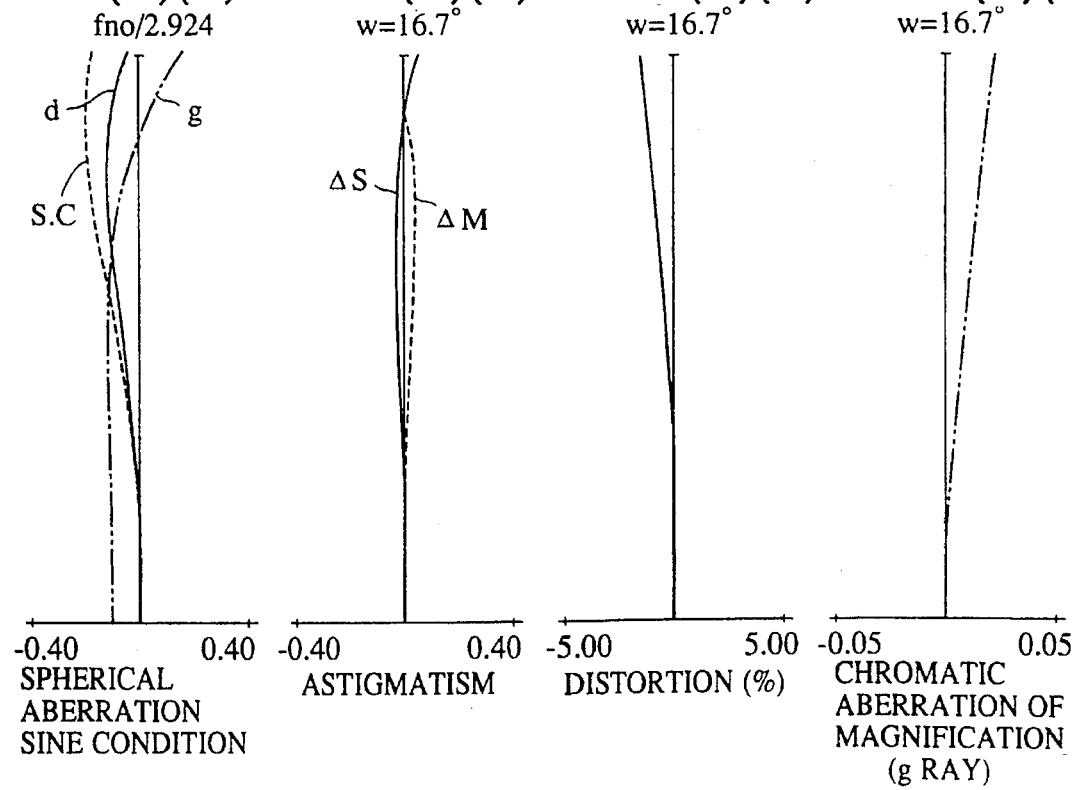

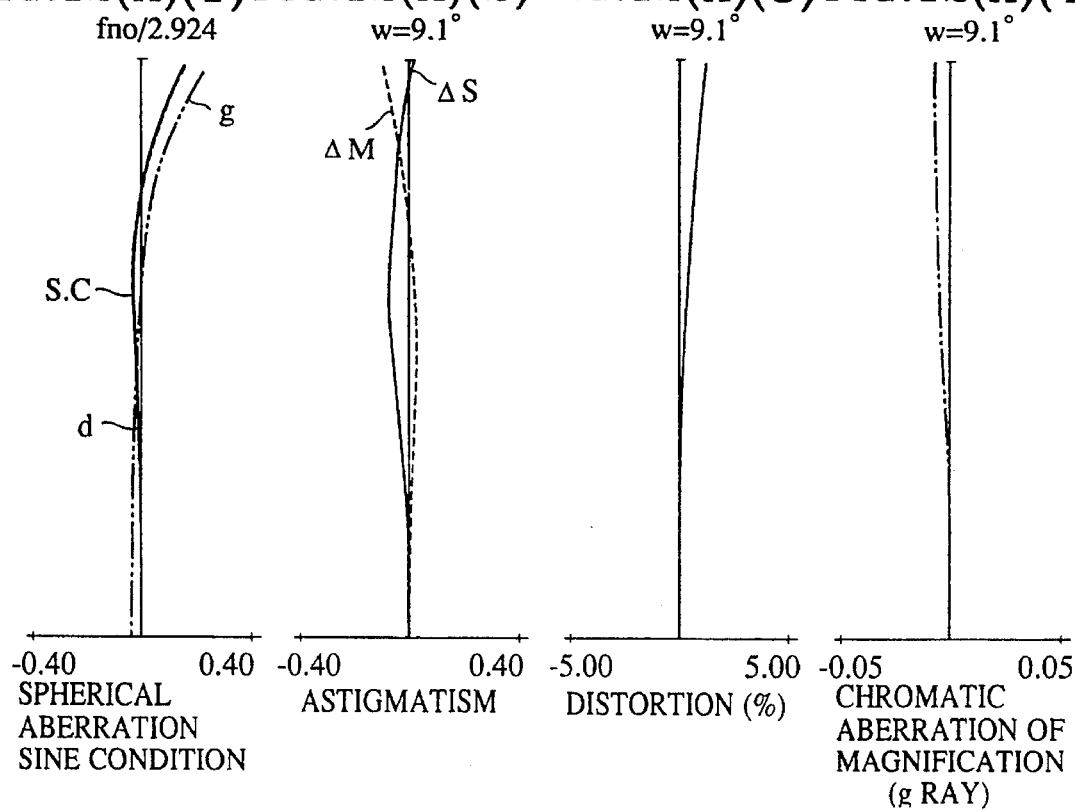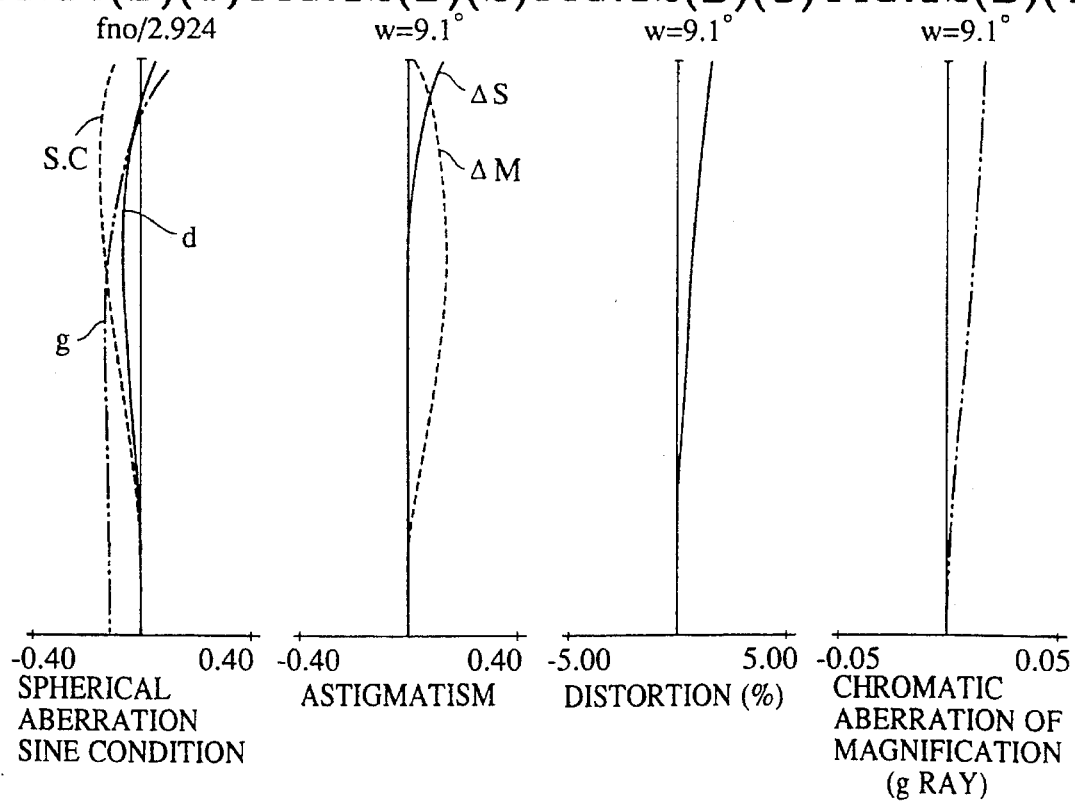

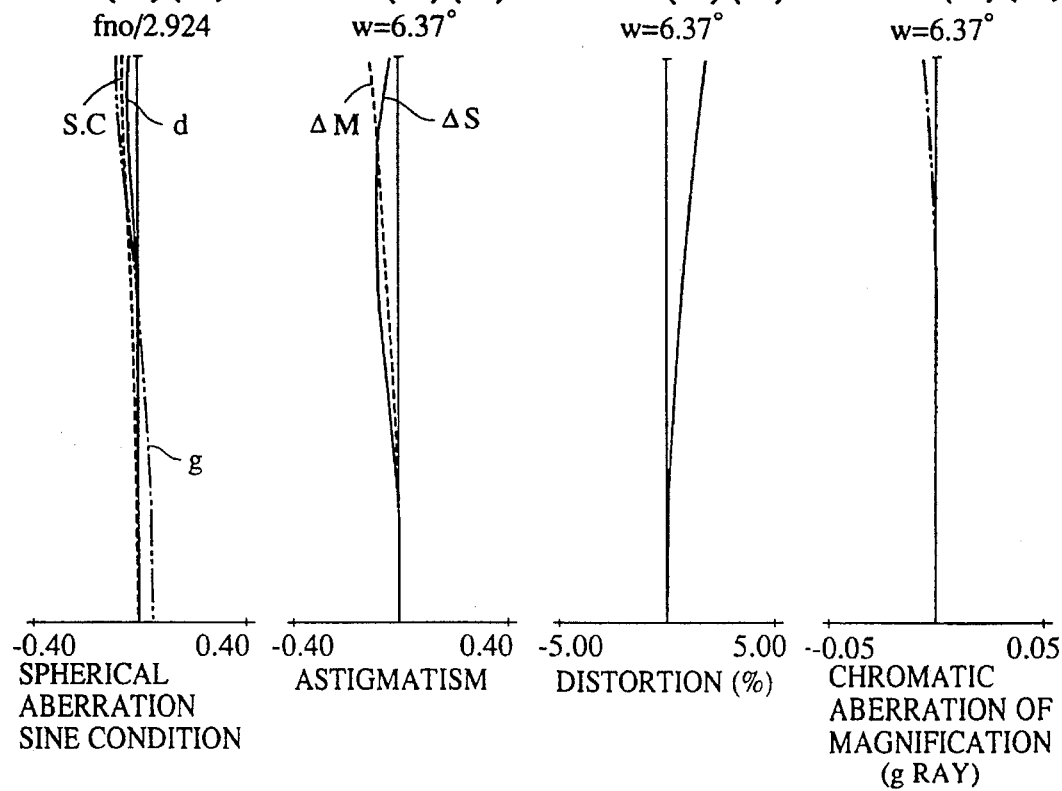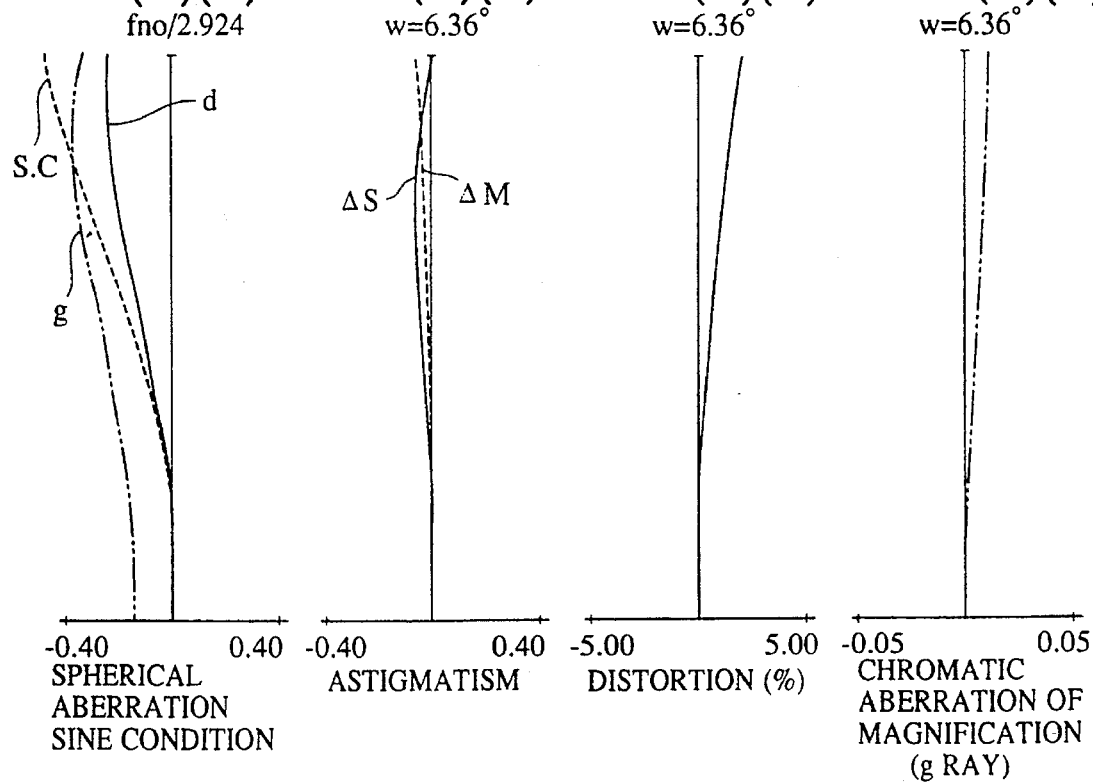

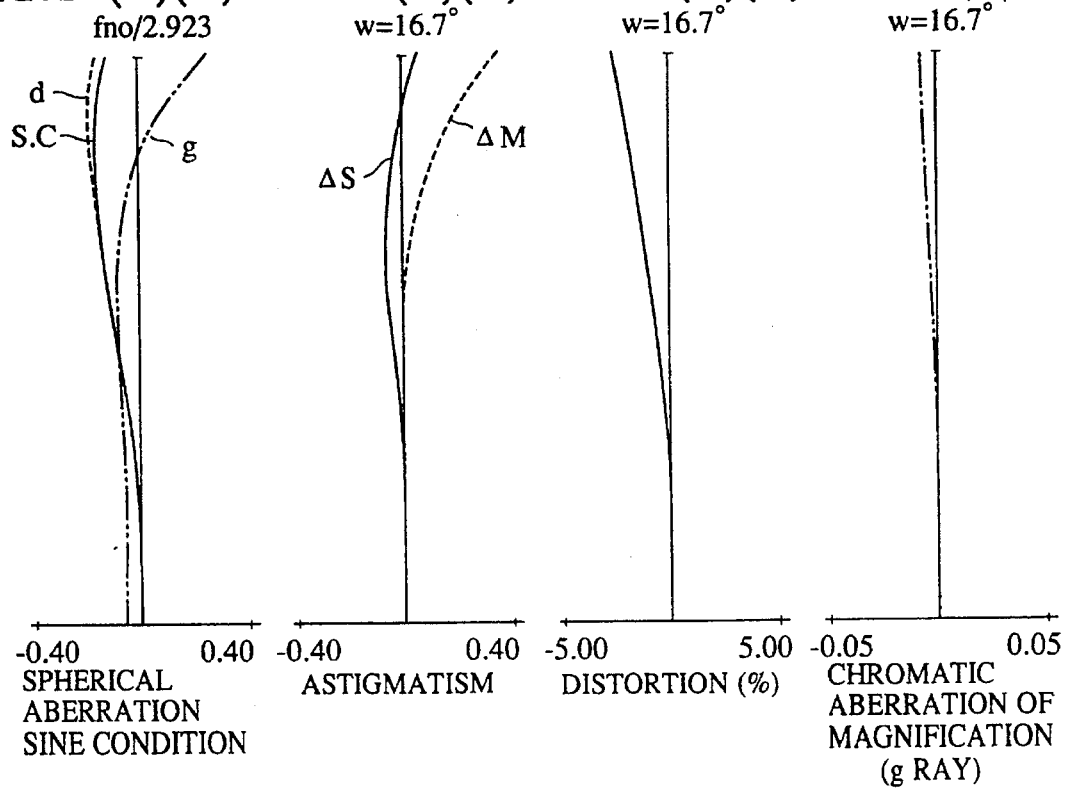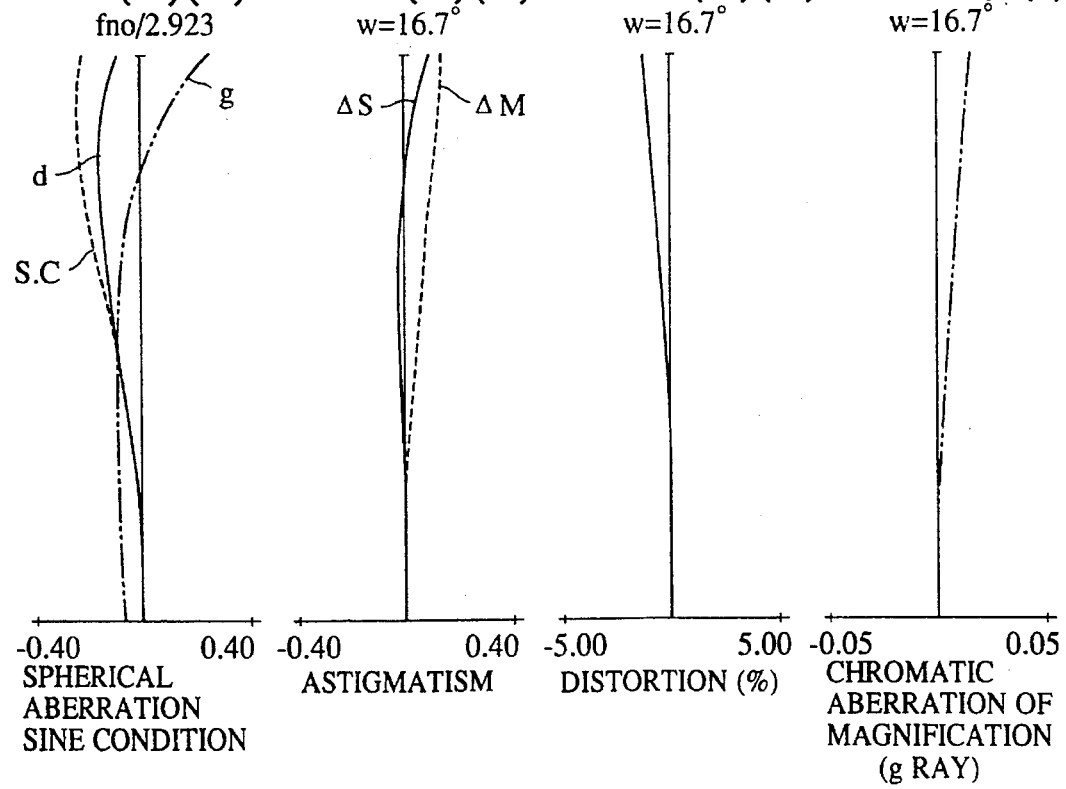

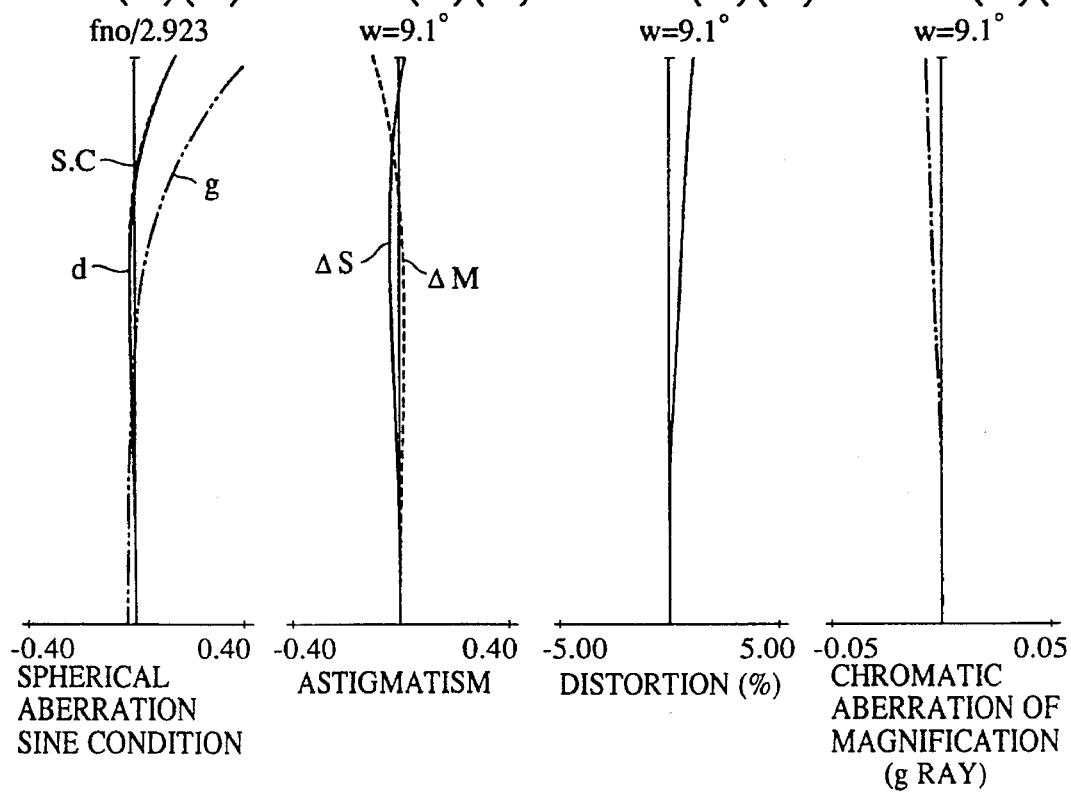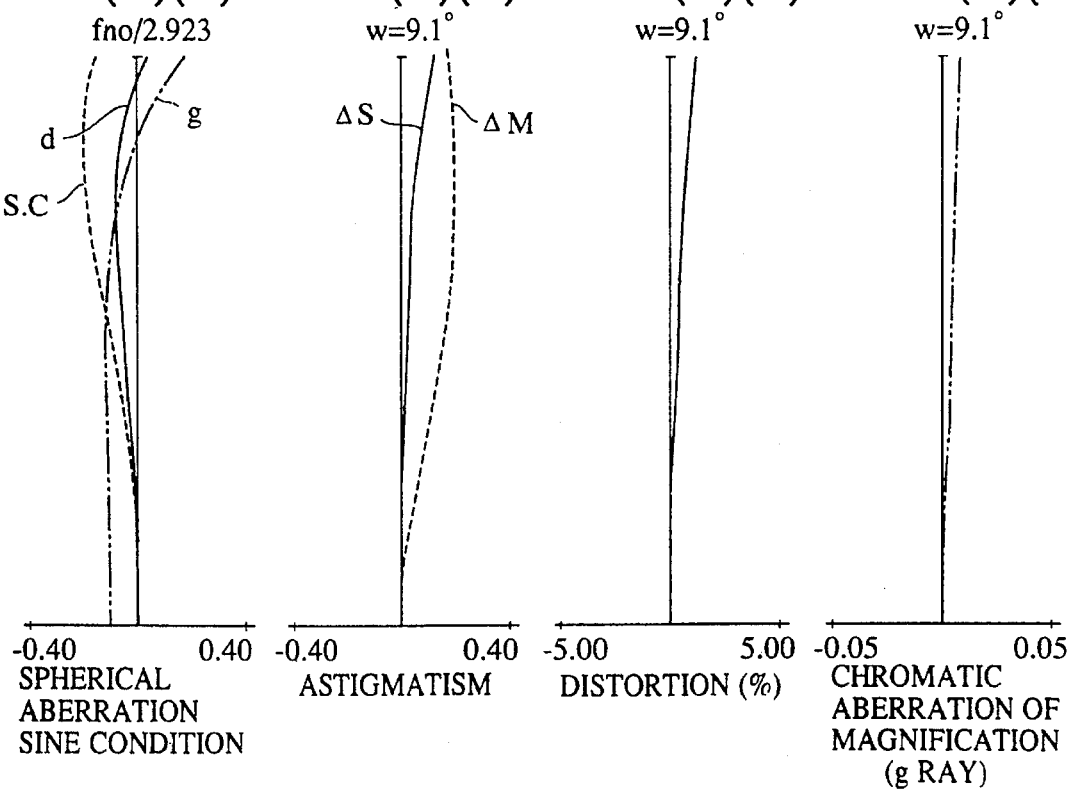

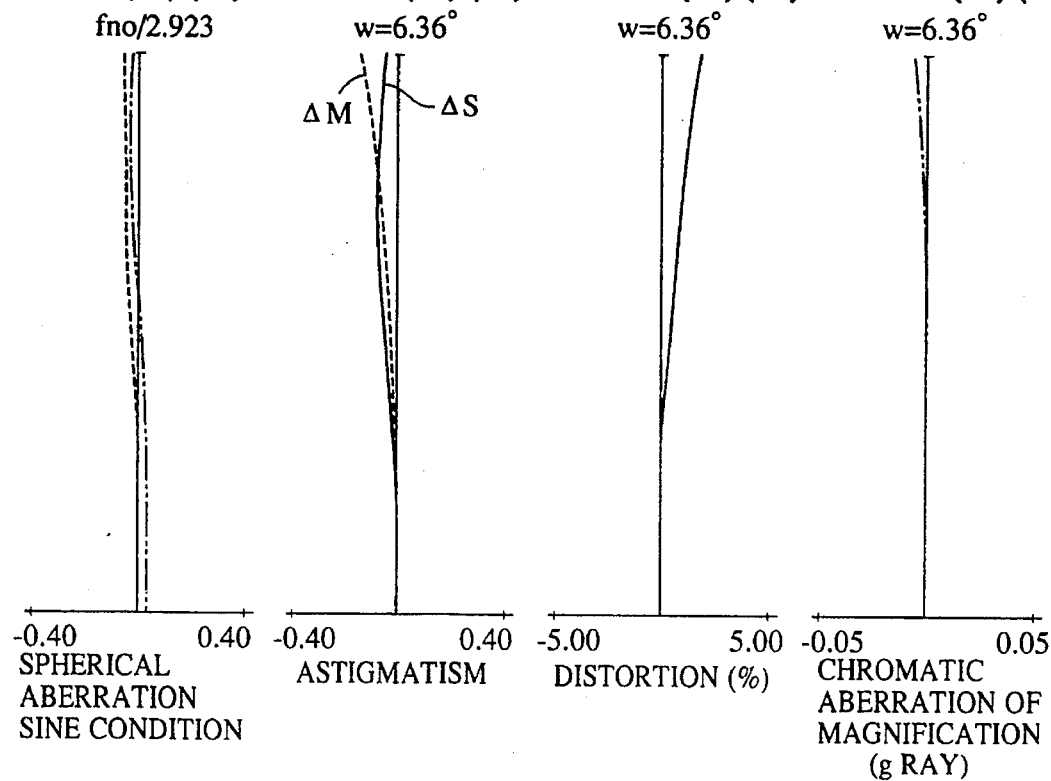
FIG.16(A)(1) FIG.16(A)(2) FIG.16(A)(3) FIG.16(A)(4)
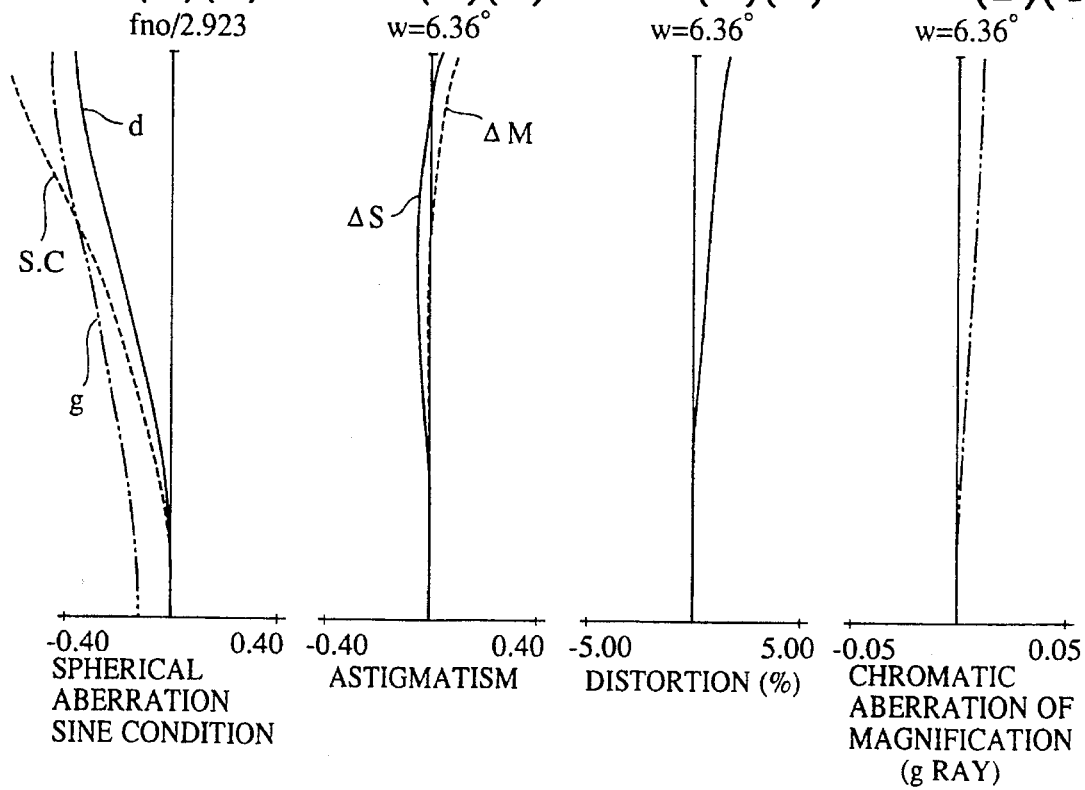
FIG.16(B)(1) FIG.16(B)(2) FIG.16(B)(3) FIG.16(B)(4)

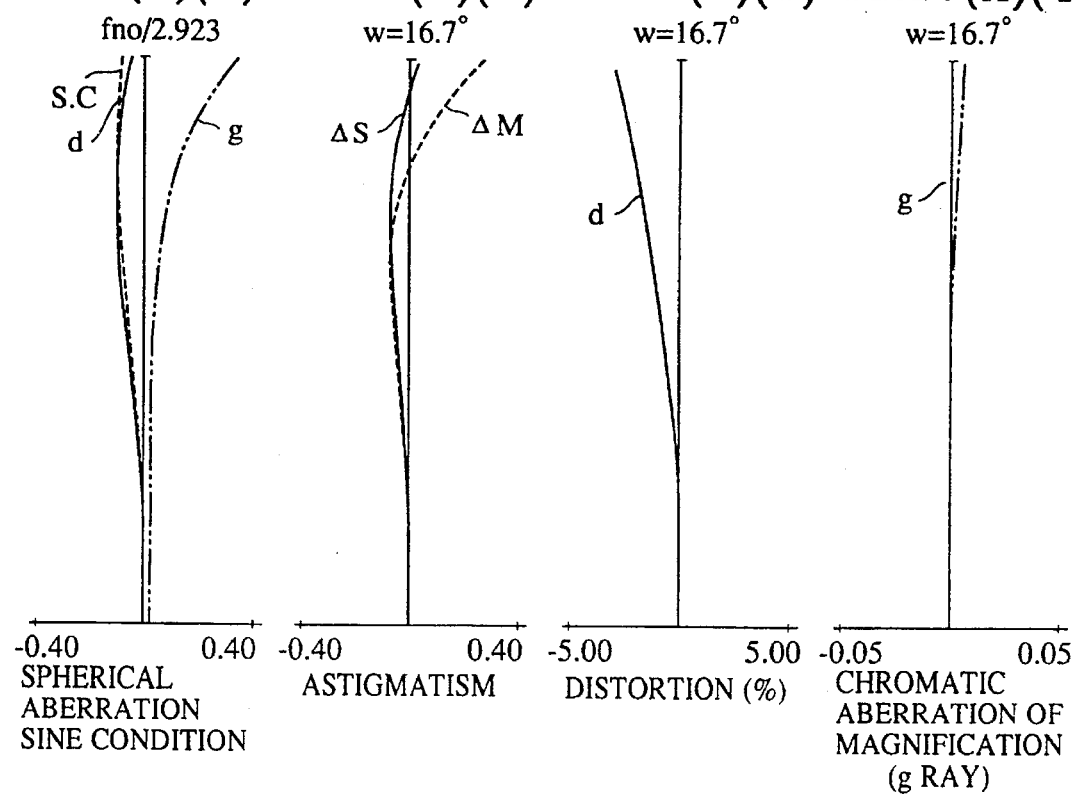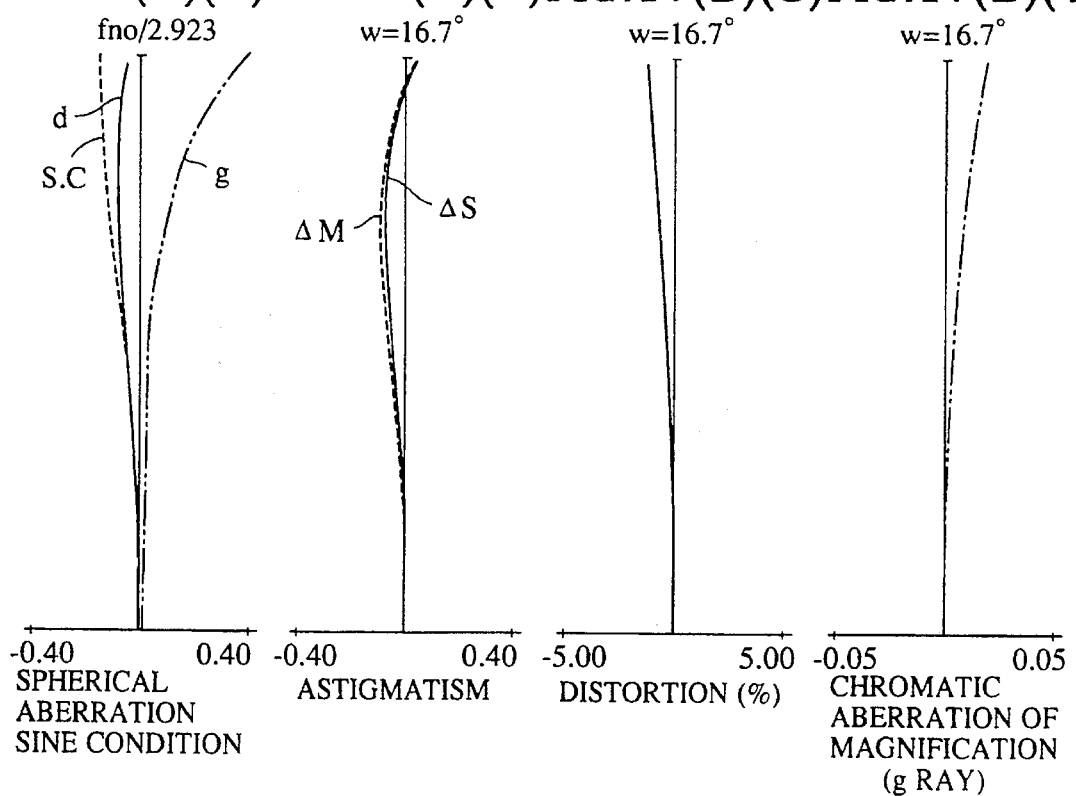

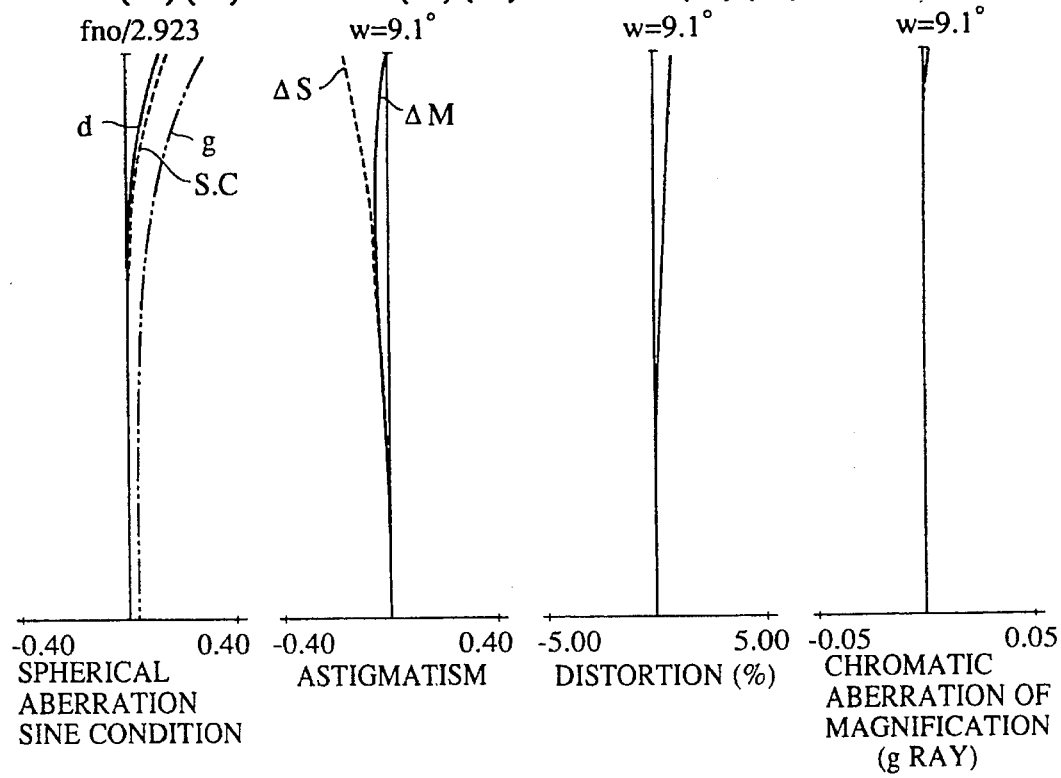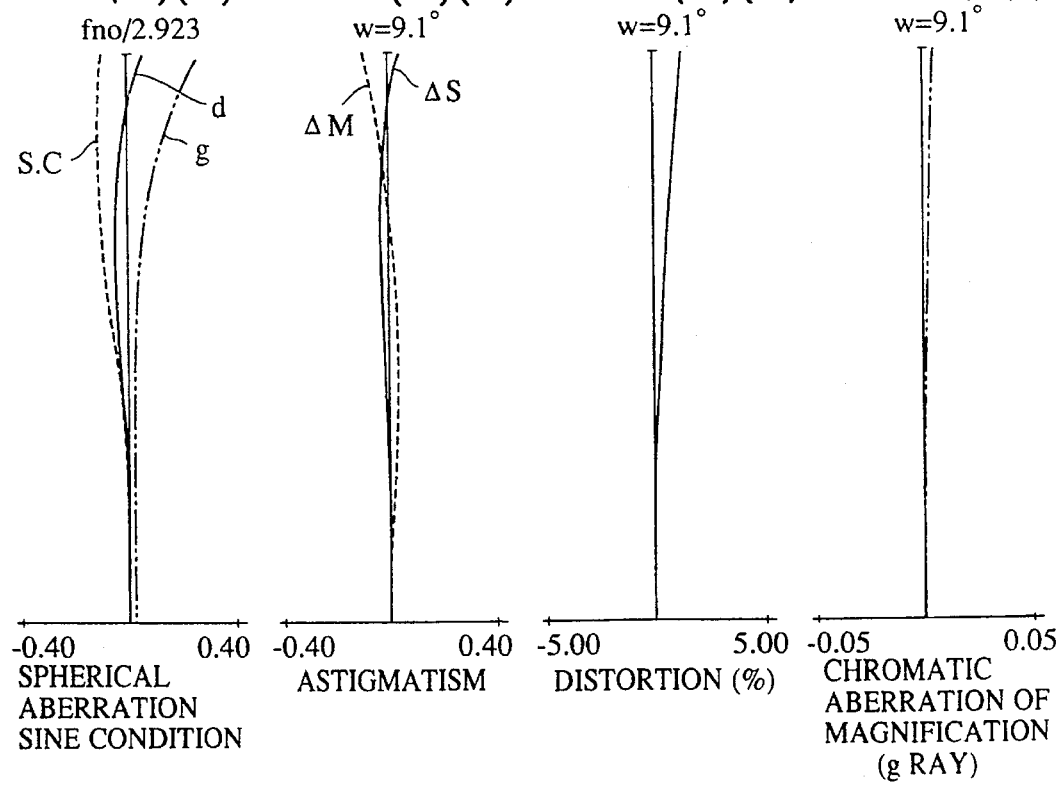

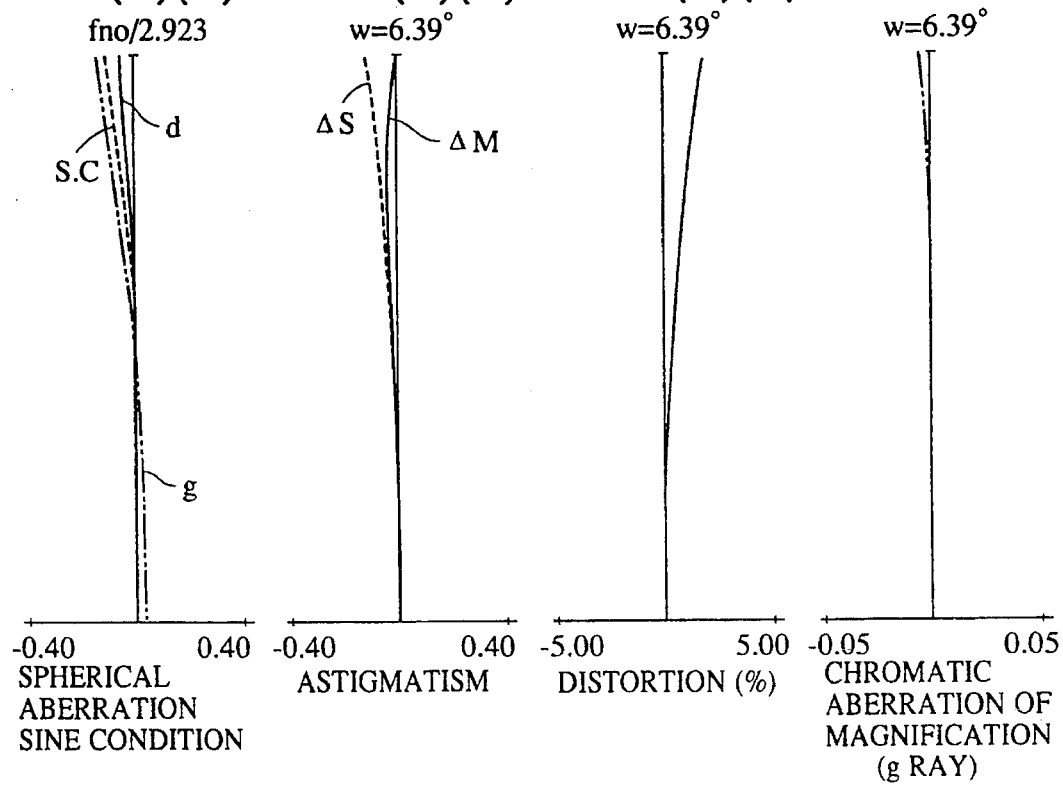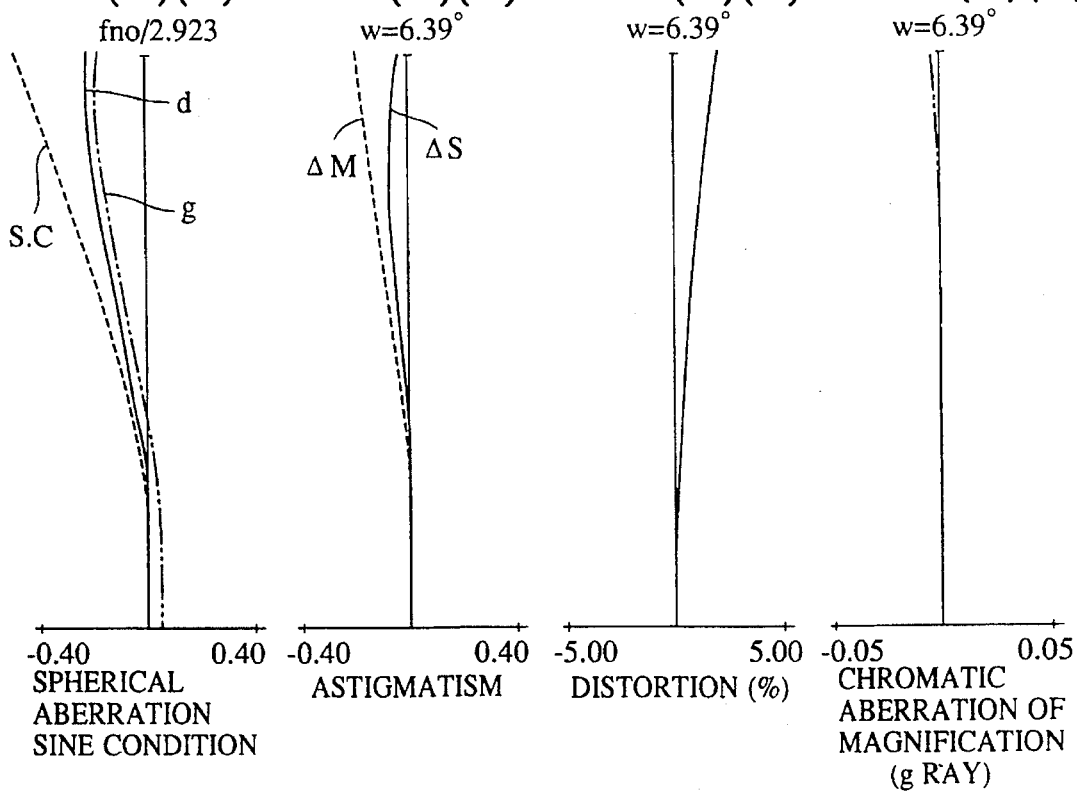

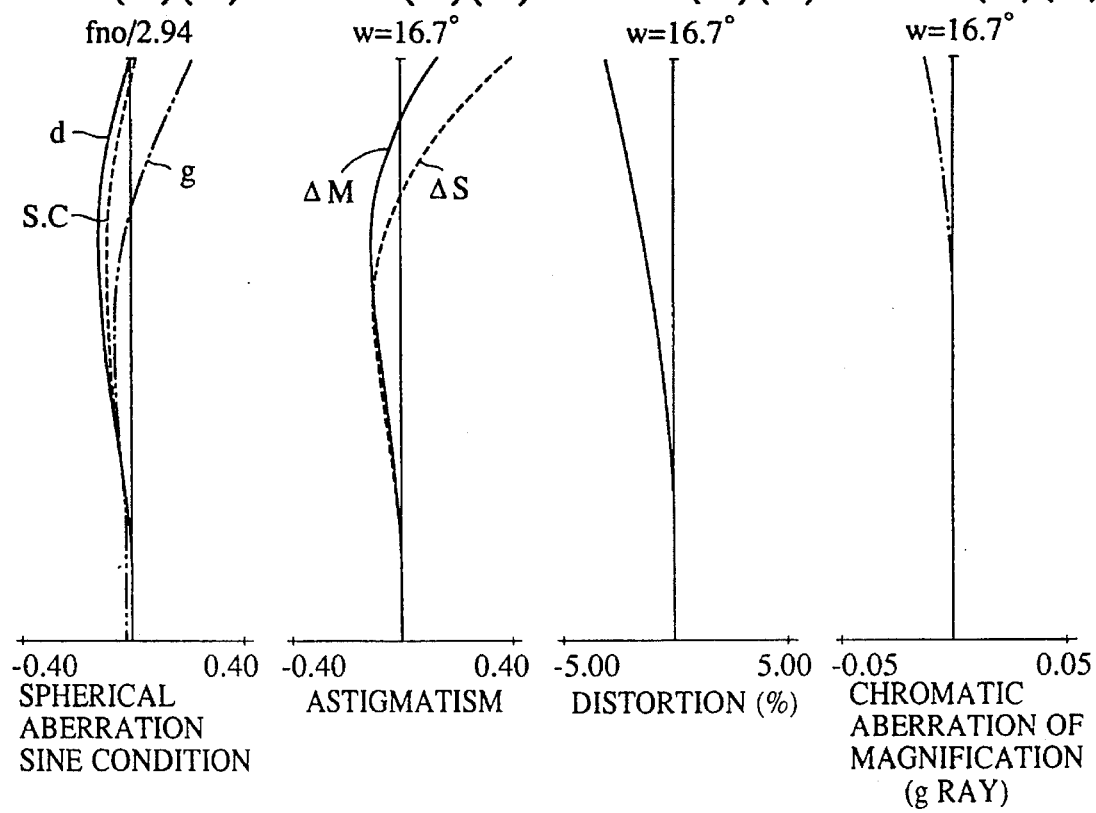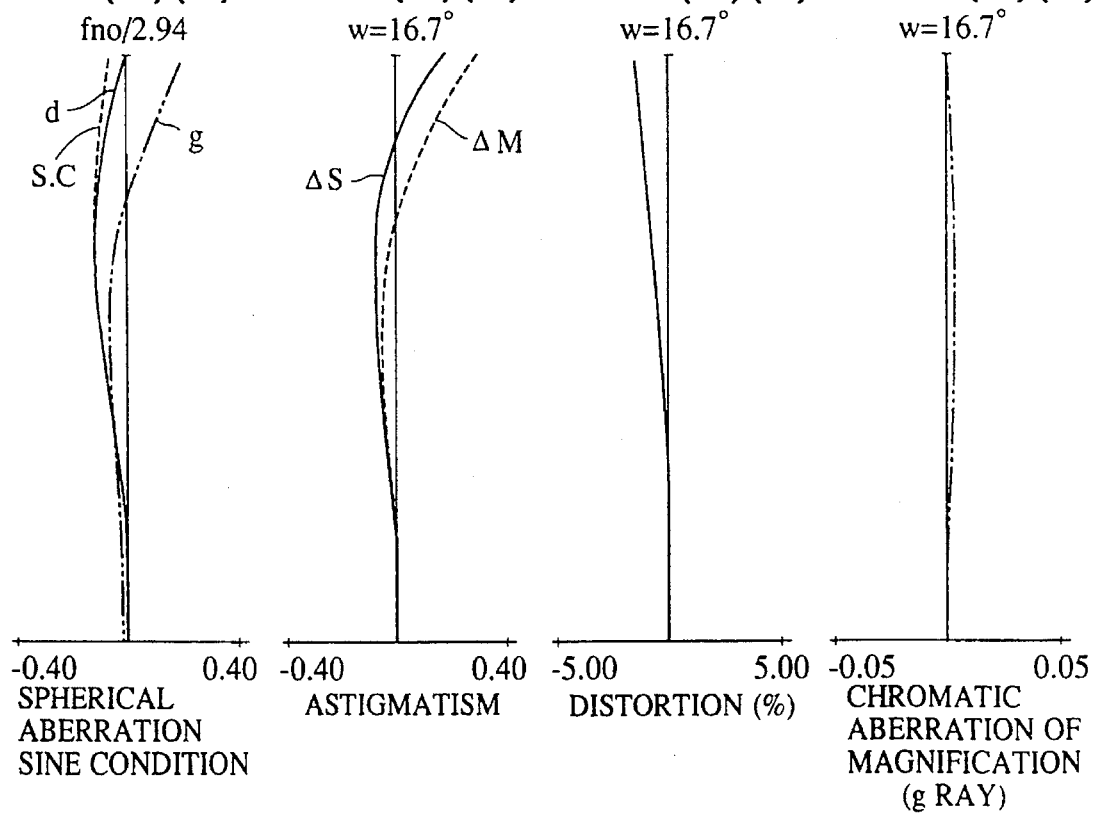

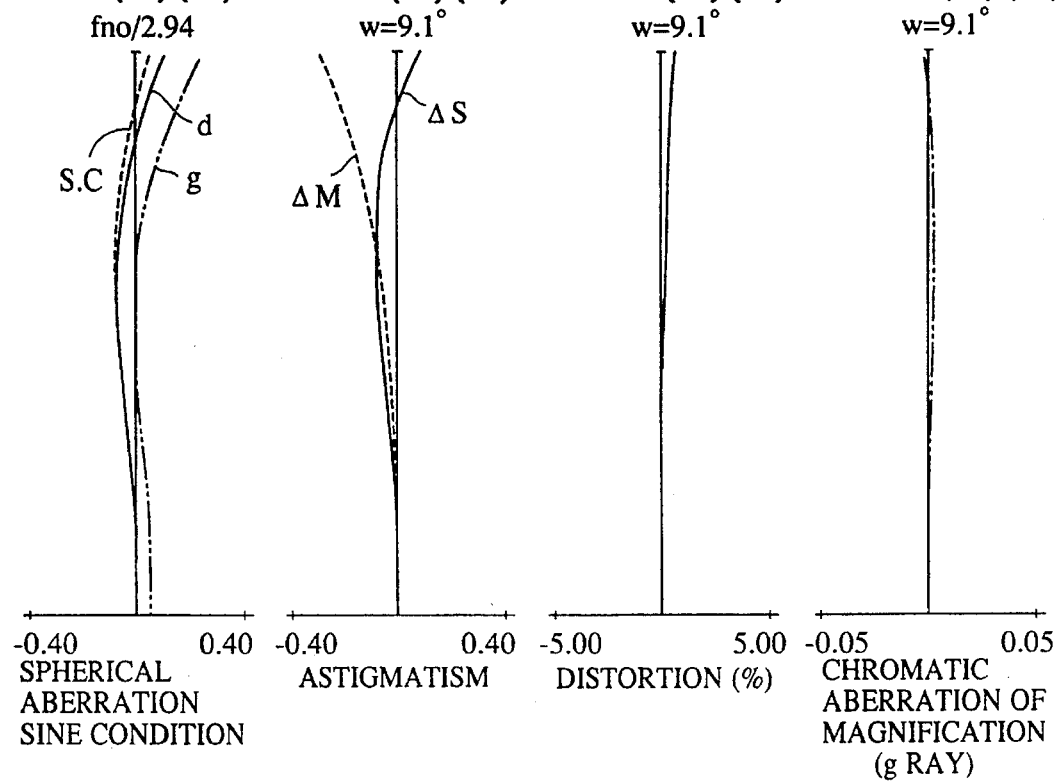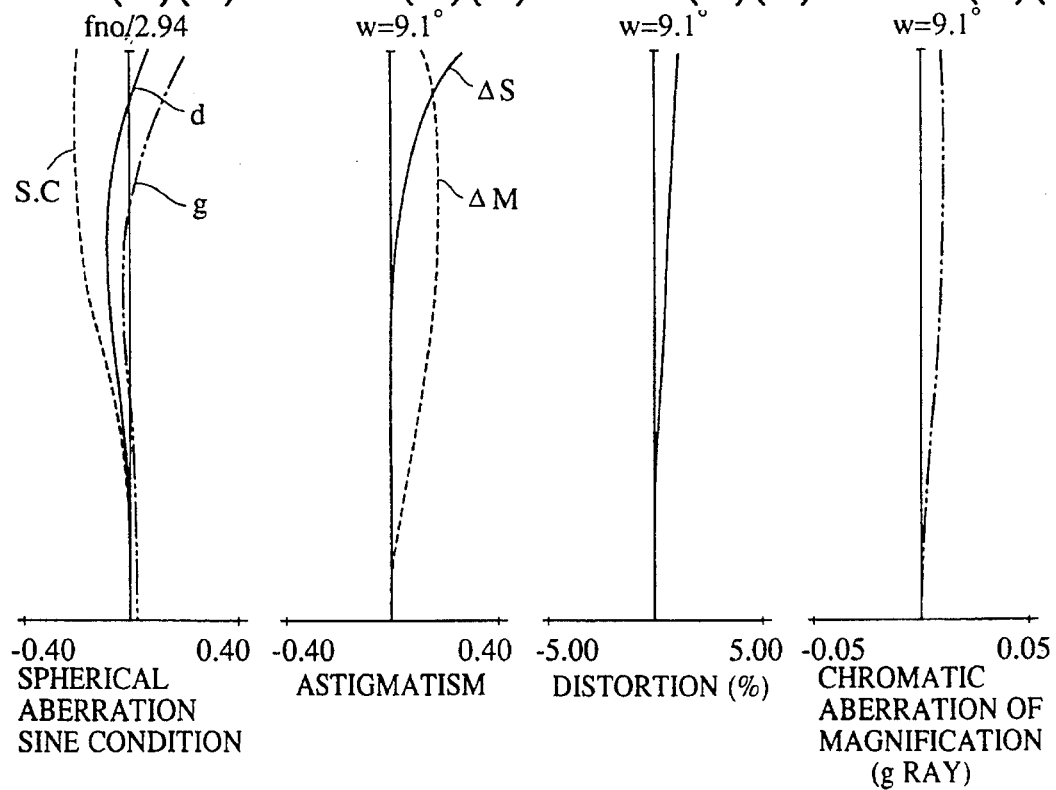

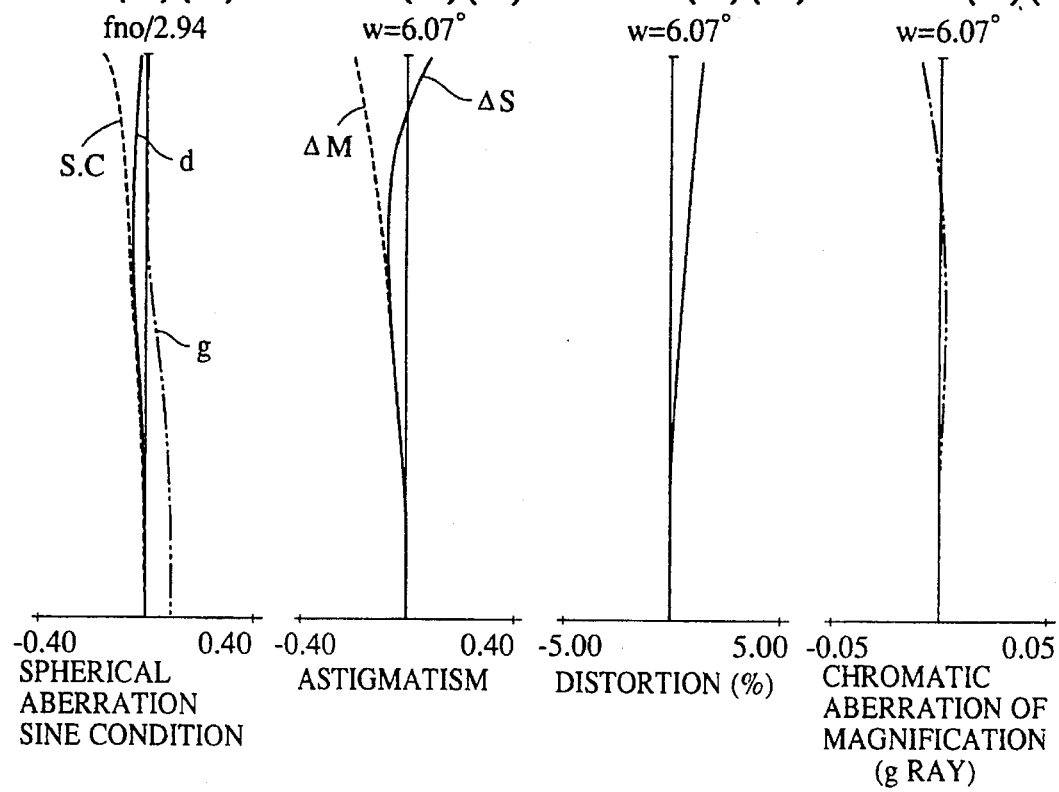
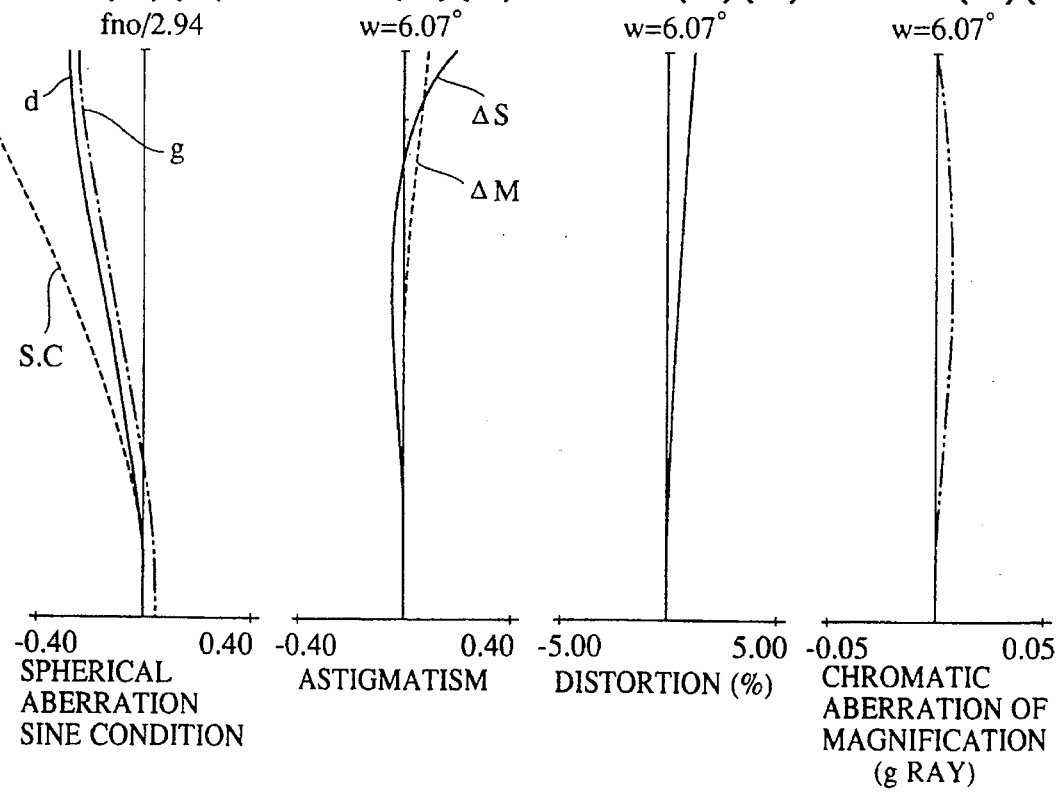

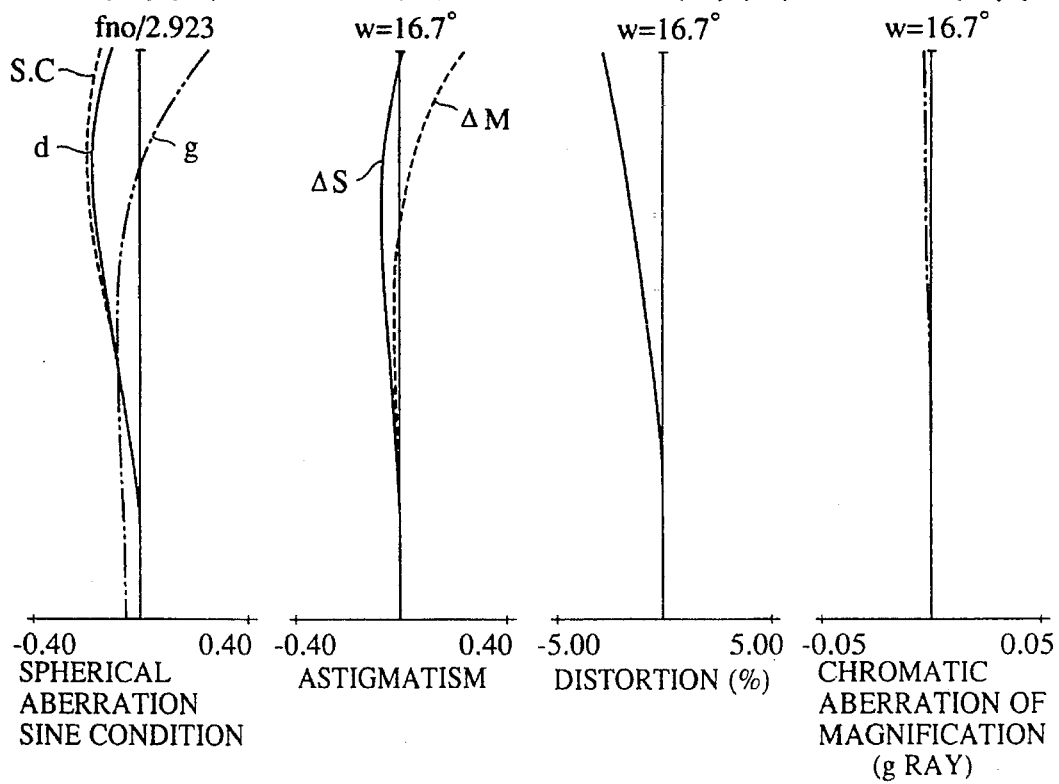
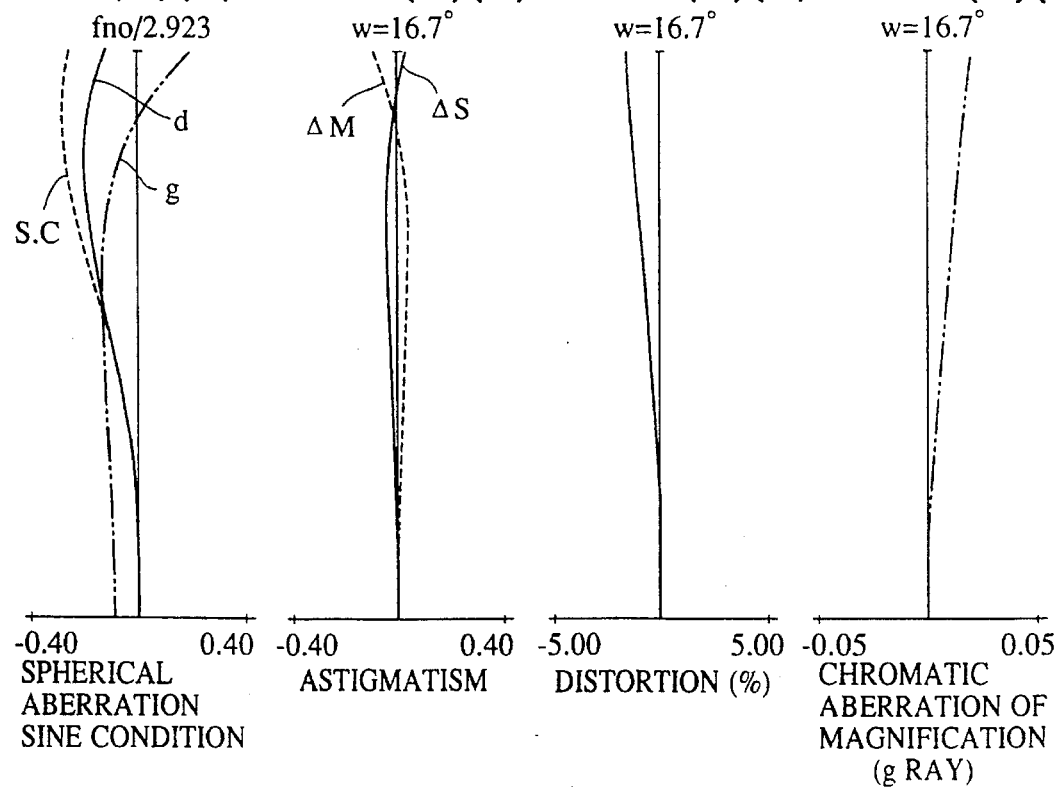

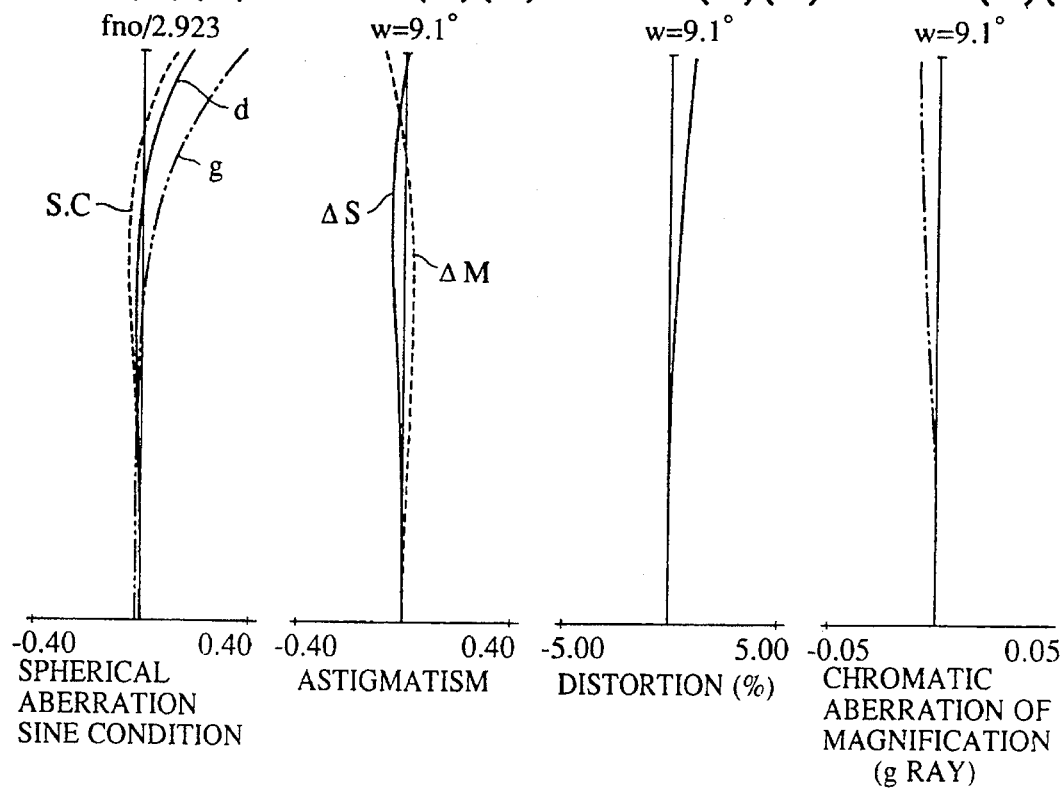
FIG.24(A)(1) FIG.24(A)(2) FIG.24(A)(3) FIG.24(A)(4)
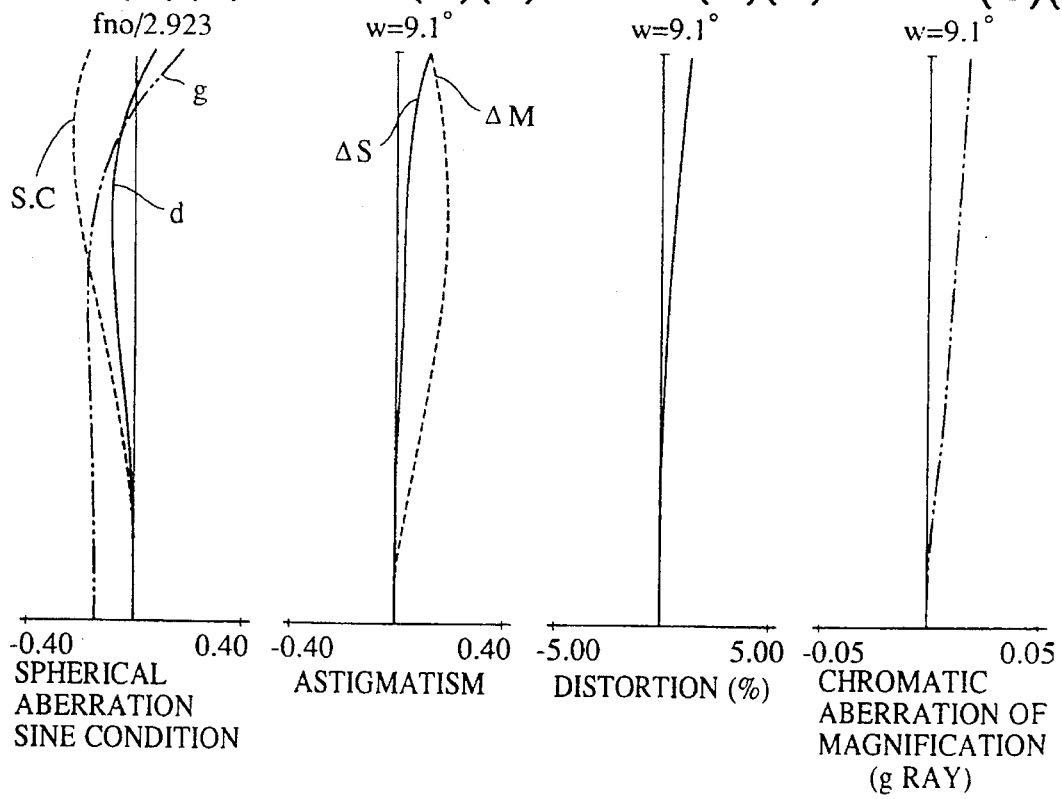
FIG.24(B)(1) FIG.24(B)(2) FIG.24(B)(3) FIG.24(B)(4)

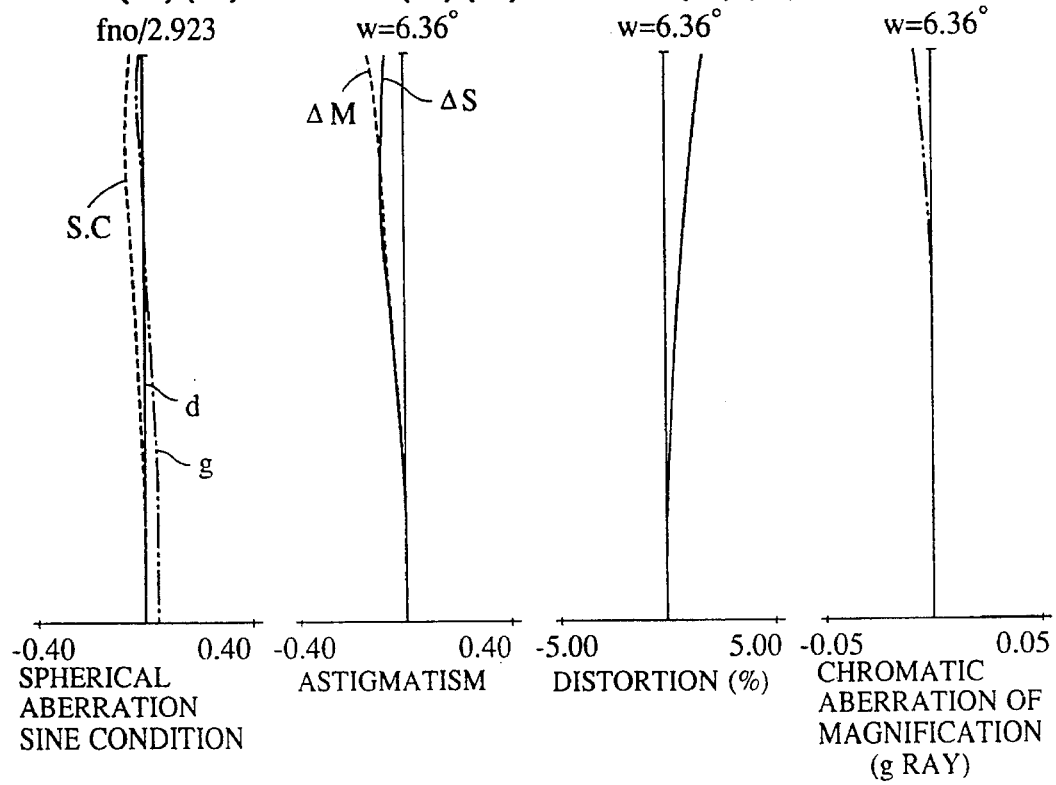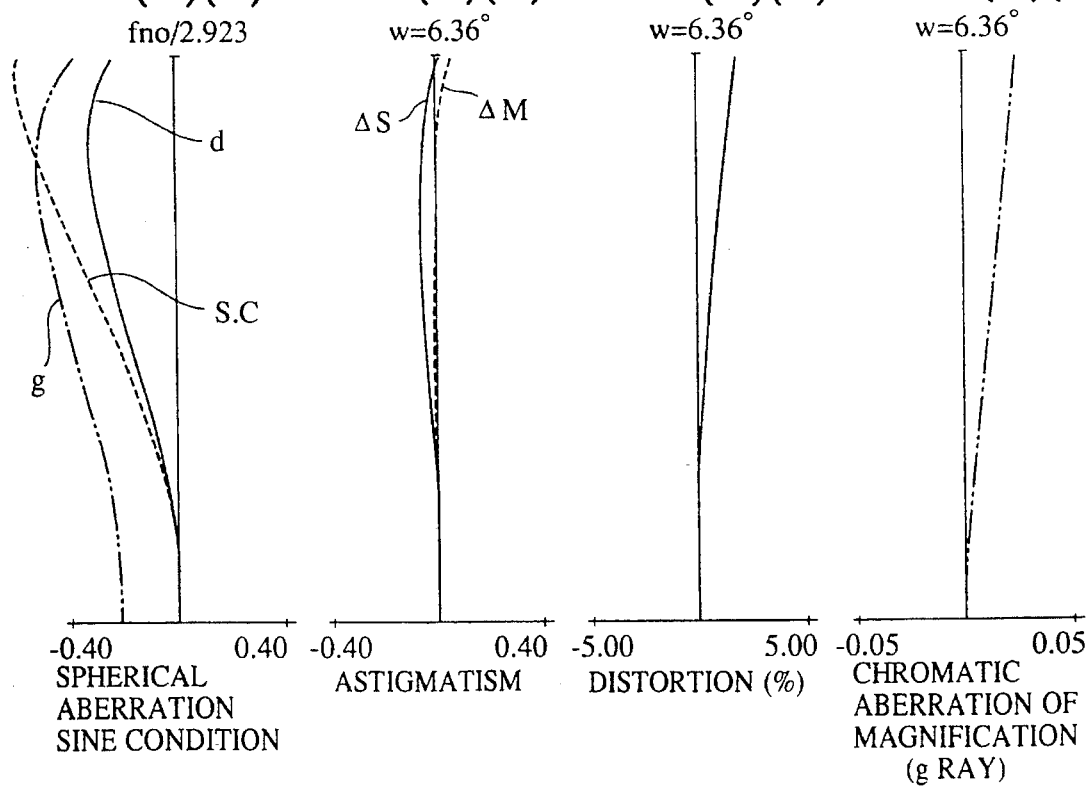

ZOOM LENS

BACKGROUND OF THE INVENTION

1. Field of the Invention

The present invention relates to a zoom lens which is suitable for a 35 mm single-lens reflex camera and, more particularly, to a zoom lens suitable for an autofocus camera in which aberrations are satisfactorily corrected although the zoom lens has a focal length at the wide angle end of about 70 mm, a zoom ratio of about 3:1, and a relatively large aperture of an F number of about 2.8.

2. Description of the Related Art

In recent years, in an autofocus camera which is increasingly the subject of development, not only is the performance of accurate focusing important, but also the attainment of rapid focus speed. The focus speed is determined mainly by power supplied to a focus motor, the efficiency of the power focus motor, the load of a lens barrel, the weight and extension of the focus lens, the computation processing speed of the autofocus, and the like. Of these factors, the factors which influence focus speed the most are the weight of the focus lens and the extension thereof. It is therefore important to achieve an optical design in which the influence of the weight and extension factors is limited to be small.

A zoom lens, having a focal length at the wide angle end of about 70 mm, a zoom ratio of about 3:1, and an F number of about 2.8 (constant during zooming), is generally formed of a first lens group having a positive refracting power, a second lens group having a negative refracting power, a third lens group having a positive refracting power, and a fourth lens group having a positive refracting power. Such a lens is well known and afocal zooming is performed by moving the second and third groups during zooming while the first and fourth groups are fixed and focusing is performed by the first lens group (front lens focusing) or a part of the first lens group (front lens inner focusing). An example of front lens focusing is proposed in, for example, Japanese Patent Laid-Open Nos. 62-108218, 64-39542, and 63-58324. Although the front lens has a relatively small aberration, the weight of the front lens is fairly heavy when it has a large aperture, for example, when the F number is F2.8. When the closest focusing distance is set at a relatively short distance, for example, about 1.5 m, the extension amount is increased relatively. Therefore, it cannot be said that the zoom lens is suitable for an autofocus camera. When the power of the front lens is increased in order to decrease the extension amount, the spherical aberration, in particular, at a near distance on the long focal point side, will become great and be undercorrected, which is problematic.

An example of front lens inner focusing is disclosed in, for example, Japanese Examined Patent No. 61-053696. Since focusing is performed by a lens group disposed relatively on the image side of the front lens, it is possible to decrease the lens diameter to some extent, and as a result, lessen the weight of the focus lens to some extent. There are advantages to this type of system even if the refracting power is increased to decrease the extension amount. For example, little aberration will occur due to the floating effect with the lens group of the front lens on the object side. Despite the advantages, such a system is nonetheless not suitable for an autofocus camera in terms of its weight.

Further examples in which the weight of the focus lens is reduced are disclosed in, for example, Japanese Examined Patent Nos. 1-25044 and 1-25043. These examples are designed to focus using a part of the fixed fourth lens group (relay); however, there are problems associated with this system, for example, aberrations, such as a spherical aberration or an astigmatism, will be large though the weight of the focus lens is fairly small.

SUMMARY OF THE INVENTION

It is an object of the present invention to provide a high-performance zoom lens which is suitable for an autofocus camera, in which the weight of the focus lens and the extension amount thereof are reduced while utilizing the advantages of the aberration characteristics of front lens inner focusing in order to eliminate the above-described problems of the prior art.

To achieve the above-described object, according to the present invention, there is provided a zoom lens comprising: at least a first lens group having a positive refracting power, a second lens group having a positive refracting power, and a third lens group having a negative refracting power in this order from the object side, which performs zooming by varying the distance between respective lens groups, wherein zooming from the wide angle end to the telephoto end is performed by moving the second and third lens groups toward the image side at different speeds and focusing is performed by the second lens group, and the condition described below is satisfied:

$$0.025 < m_2/f_T < 0.135 \ (m_2 > 0) \quad (1)$$

where $f_T$ is the focal distance at the telephoto end of the entire system, and $m_2$ is the amount of zoom movement of the second lens group from the wide angle end to the telephoto end.

The above and further objects and novel features of the invention will more fully appear from the following detailed description when read in connection with the accompanying drawings.

BRIEF DESCRIPTION OF THE DRAWINGS

FIGS. 8(A) and 8(B) show various aberrations at the wide angle end in accordance with the first numerical embodiment of the zoom lens of the present invention;

FIGS. 9(A) and 9(B) show various aberrations at the intermediate region in accordance with the first numerical embodiment of the zoom lens of the present invention;

FIGS. 10(A) and 10(B) show various aberrations at the telephoto end in accordance with the first numerical embodiment of the zoom lens of the present invention;

FIGS. 11(A) and 11(B) show various aberrations at the wide angle end in accordance with the second numerical embodiment of the zoom lens of the present invention;

FIGS. 12(A) and 12(B) show various aberrations at the intermediate region in accordance with the second numerical embodiment of the zoom lens of the present invention;

FIGS. 13(A) and 13(B) show various aberrations at the telephoto end in accordance with the second numerical embodiment of the zoom lens of the present invention;

FIGS. 14(A) and 14(B) show various aberrations at the wide angle end in accordance with the third numerical embodiment of the zoom lens of the present invention;

FIGS. 15(A) and 15(B) show various aberrations at the intermediate region in accordance with the third numerical embodiment of the zoom lens of the present invention;

FIGS. 16(A) and 16(B) show various aberrations at the telephoto end in accordance with the third numerical embodiment of the zoom lens of the present invention;

FIGS. 17(A) and 17(B) show various aberrations at the wide angle end in accordance with the fourth numerical embodiment of the zoom lens of the present invention;

FIGS. 18(A) and 18(B) show various aberrations at the intermediate region in accordance with the fourth numerical embodiment of the zoom lens of the present invention;

FIGS. 19(A) and 19(B) show various aberrations at the telephoto end in accordance with the fourth numerical embodiment of the zoom lens of the present invention;

FIGS. 20(A) and 20(B) show various aberrations at the wide angle end in accordance with the fifth numerical embodiment of the zoom lens of the present invention;

FIGS. 21(A) and 21(B) show various aberrations at the intermediate region in accordance with the fifth numerical embodiment of the zoom lens of the present invention;

FIGS. 22(A) and 22(B) show various aberrations at the telephoto end in accordance with the fifth numerical embodiment of the zoom lens of the present invention;

FIGS. 23(A) and 23(B) show various aberrations at the wide angle end in accordance with the sixth numerical embodiment of the zoom lens of the present invention;

FIGS. 24(A) and 24(B) show various aberrations at the intermediate region in accordance with the sixth numerical embodiment of the zoom lens of the present invention; and FIGS. 25(A) and 25(B) show various aberrations at the telephoto end in accordance with the sixth numerical embodiment of the zoom lens of the present invention.

DESCRIPTION OF THE PREFERRED EMBODIMENTS

Preferred embodiments of the present invention will be described below.

Figure 1A:
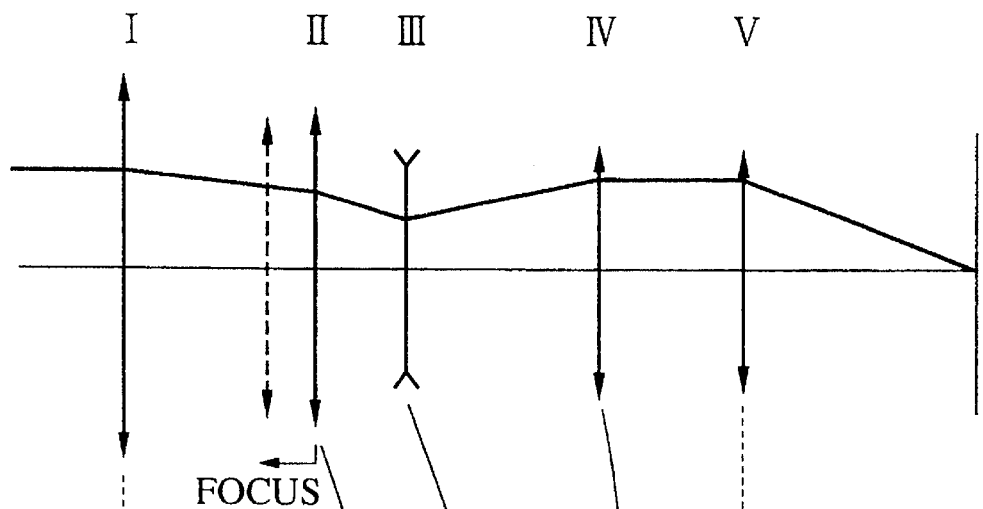
FIGS. 1(a) and 1(b) show the paraxial refracting power arrangement of a zoom lens in accordance with the present invention.
Figure 1B:
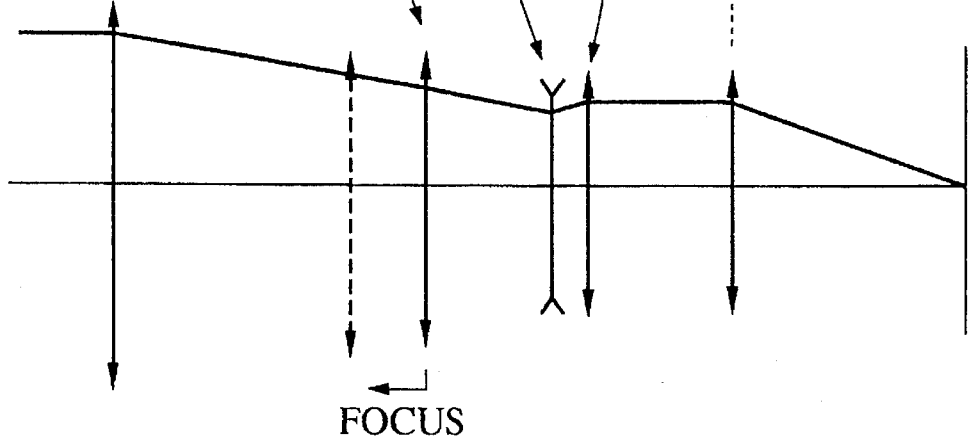
Figure 2:
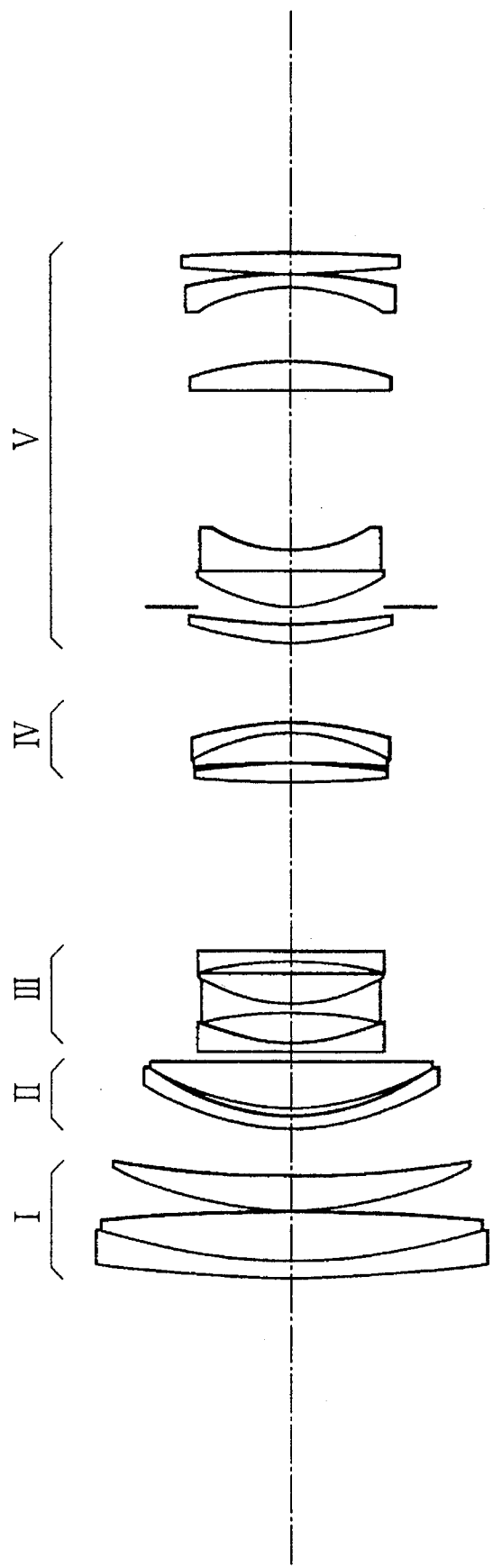
FIG. 2 is a sectional view of lenses in accordance with a first numerical embodiment of the zoom lens in accordance with the present invention.
Figure 3:
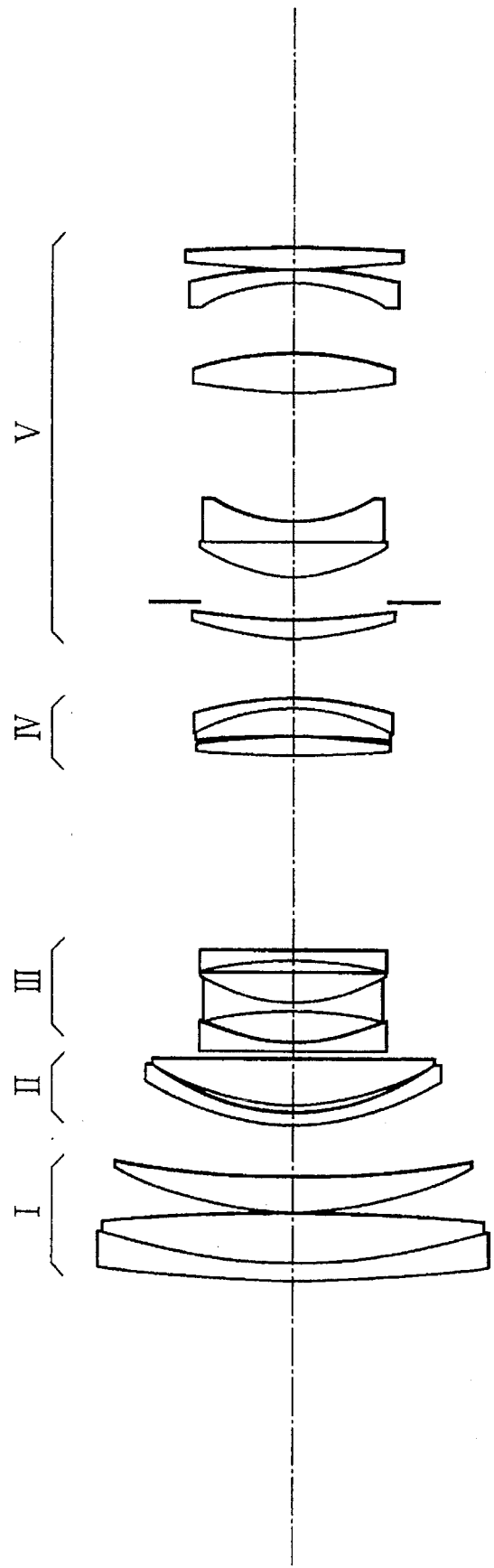
FIG. 3 is a sectional view of lenses in accordance with a second numerical embodiment of the zoom lens in accordance with the present invention.
Figure 4:
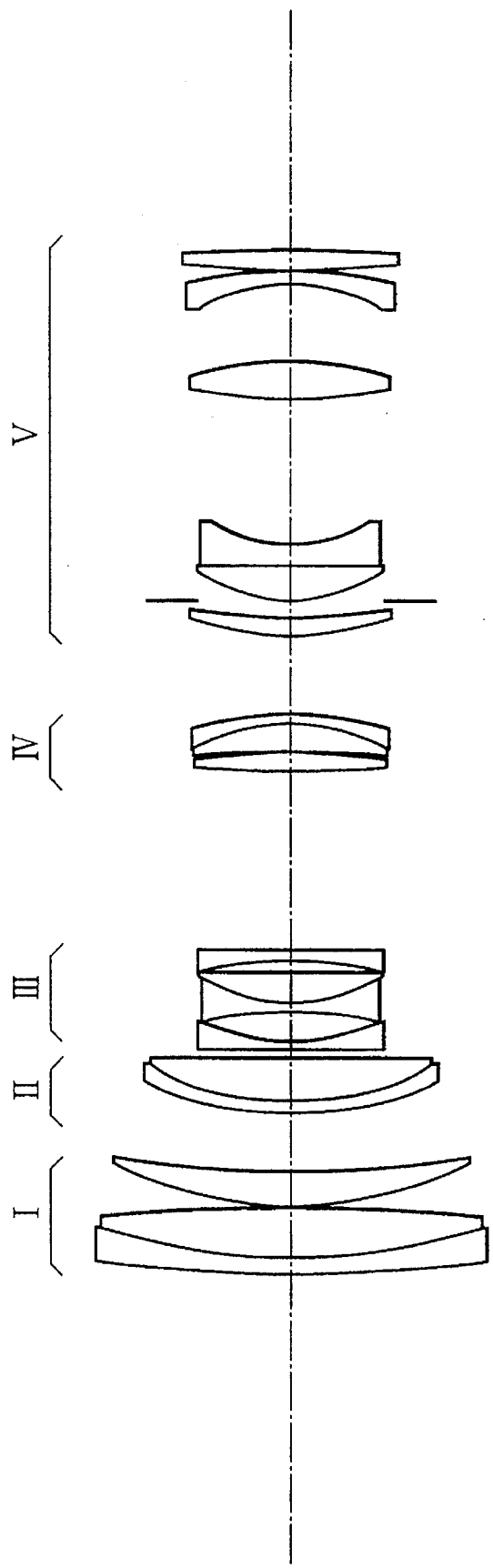
FIG. 4 is a sectional view of lenses in accordance with a third numerical embodiment of the zoom lens in accordance with the present invention.
Figure 5:
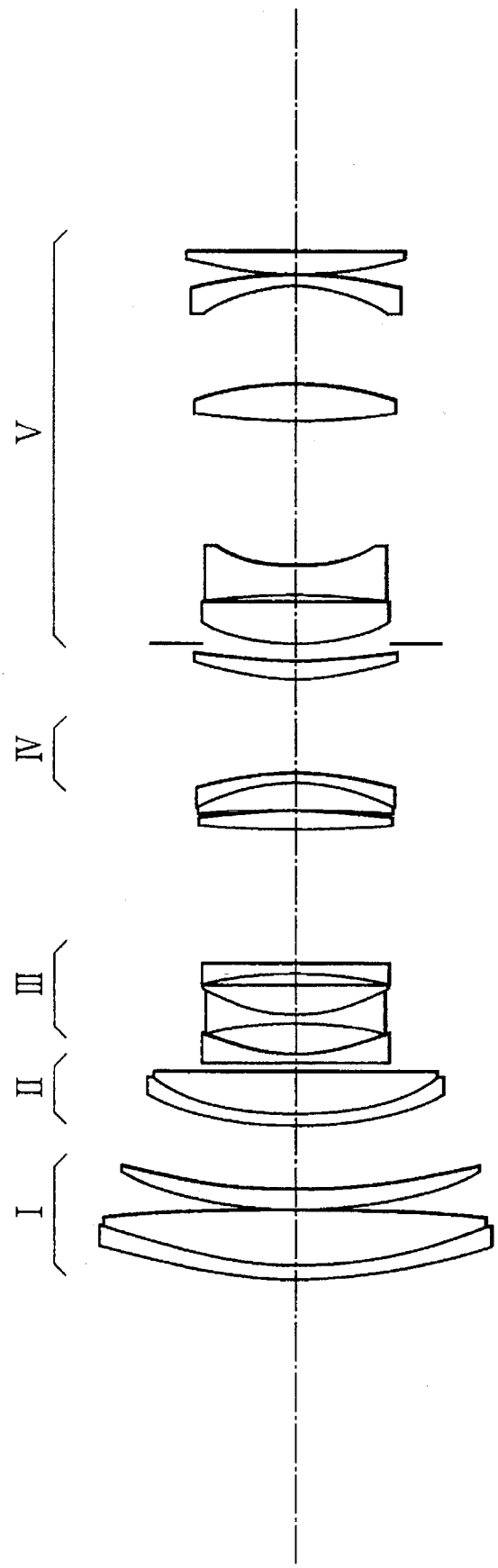
FIG. 5 is a sectional view of lenses in accordance with a fourth numerical embodiment of the zoom lens in accordance with the present invention.
Figure 6:
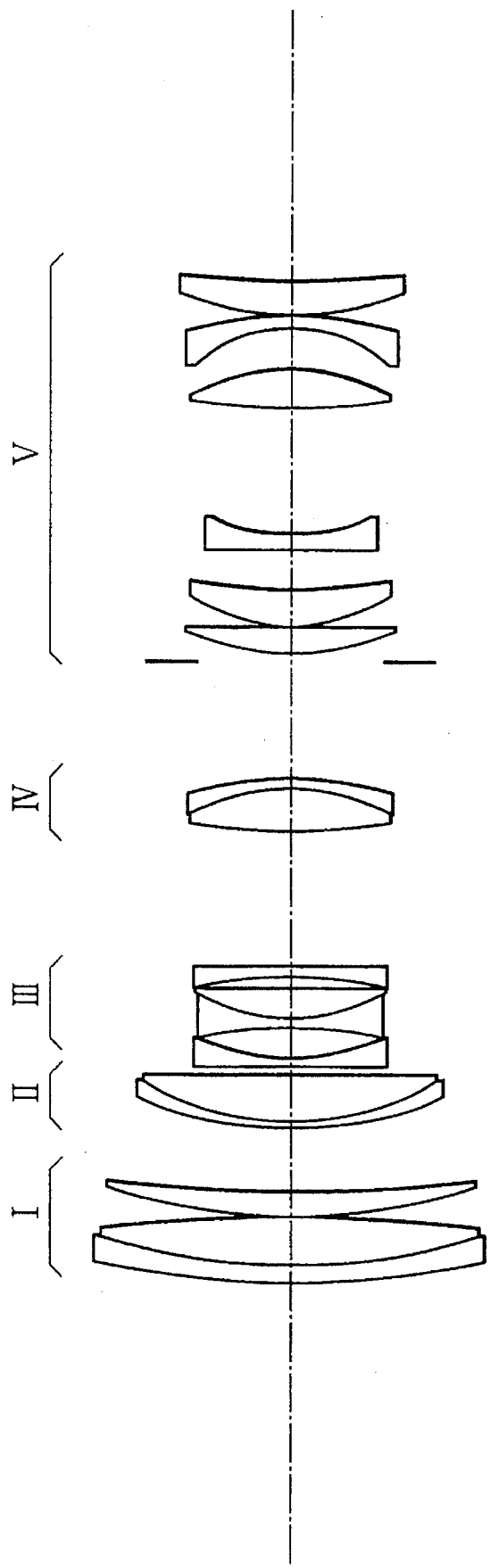
FIG. 6 is a sectional view of lenses in accordance with a fifth numerical embodiment of the zoom lens in accordance with the present invention.
Figure 7:
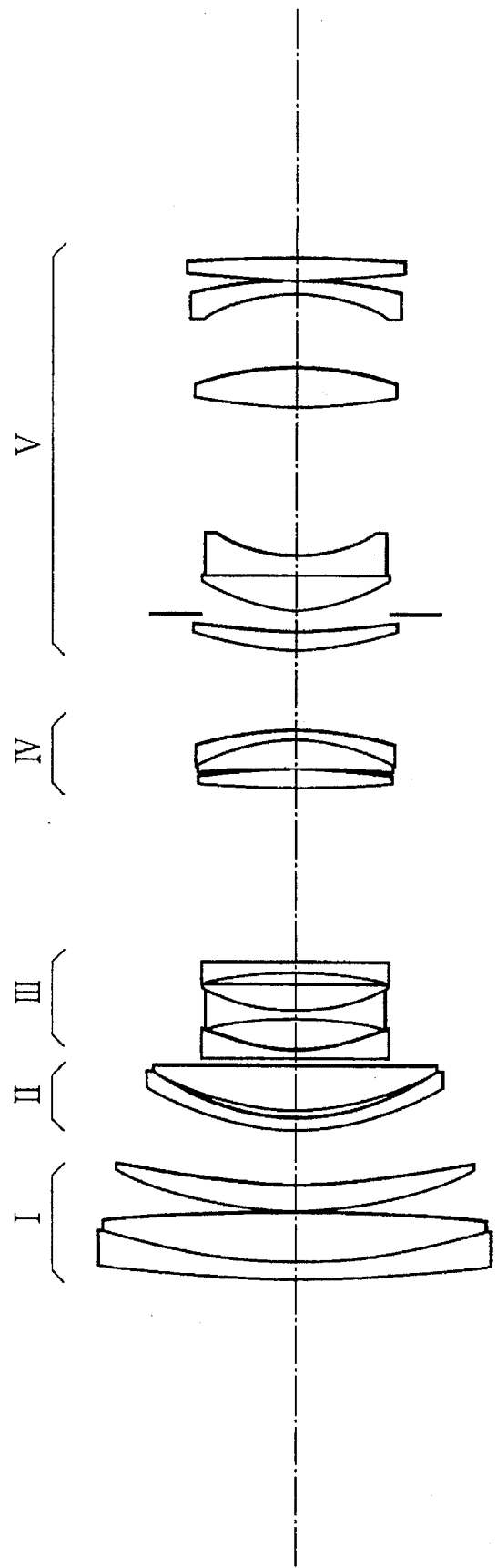
FIG. 7 is a sectional view of lenses in accordance with a sixth numerical embodiment of the zoom lens in accordance with the present invention.

FIGS. 1(a) and 1(b) show the paraxial refracting power arrangement of a zoom lens in accordance with the present invention. In particular, FIG. 1(a) shows the state in which the axial light beam is passed at the short focal point end; FIG. 1(b) shows the state in which the paraxial light beam is passed at the long focal point end. Reference characters I to V denote the first to fifth lens groups, respectively, from the object side to the image side. Zooming is increased by moving the third lens group having a negative refracting power toward the image side, while the first lens group having a positive refracting power and the fifth lens group having a positive refracting power are fixed. The variation of the image point caused by zooming is corrected primarily by moving the fourth lens group having a positive refracting power. During this operation, the second lens group is moved in such a manner as to move away from the first lens group, i.e., toward the image plane, and to the long focal length side of the range in which the conditional equation (1) described above is satisfied.

When a change of the paraxial light beam to the first lens group is seen during zooming, the change is low on the short focal-point side and conversely high on the long focal-point side, and the paraxial light beam converges as a result of the positive refracting power of the first lens group. Thus, the second lens group is moved as described above in order to decrease the outer diameter of the lenses of the second lens group determined by the incidence height of the paraxial light beam on the long focal point side.

FIGS. 2 to 7 are sectional views of lenses shown in numerical embodiments which will be described later. Reference characters I to V denote first to fifth lens groups, respectively.

Conditional equation (1) is concerned with the amount of movement of zooming at the long focal point end with the short focal point side end of the second lens group being a reference, and defines a condition for reducing the weight of the lenses while satisfactorily suppressing the aberration. If the amount of movement is increased beyond the upper limit of conditional equation (1), the lens weight is reduced because the outer diameter of the lenses is decreased; however, a reduction effect is increased during zooming because of the positive refracting power of the second lens group. Thus, both the negative refracting power of the third lens group and the positive refracting power of the fourth lens group for the purpose of obtaining a desired zoom ratio are increased, and therefore, even if the number of lenses of the third and fourth lens groups is increased, variations due to zooming, such as spherical aberration or coma aberration, cannot be removed. In addition, at the long focal-point side, the distortion aberration will greatly vary, and pin-cushion distortion will become conspicuous, which is undesirable.

If, conversely, the amount of movement is decreased beyond the lower limit of conditional equation (1), the refracting powers of the third and fourth lens groups are decreased. This is advantageous as regards aberration correction; however, as the outer diameter of the lenses is increased, reducing the weight of the lenses becomes difficult.

Although the object of the present invention can be sufficiently achieved without changing the numerical range of conditional equation (1), more preferably, the range should be the following numerical range:

$$0.09 < m_2/f_1 < 0.13 \tag{1'}$$

Still more preferably, if the focal lengths of the first and second lens groups are denoted as $f_1$ and $f_2$, respectively, and the following condition is satisfied:

$$0.75 < f_1/f_2 < 1.50 \tag{2}$$

it is easy to give optical performance for practical use.

Conditional equation (2) is concerned with the ratio of the refracting power of the first lens group to that of the second lens group. Conditional equation (2) satisfies conditional equation (1), and also regulates the amount of focus extension of the second lens group while correcting aberration satisfactorily.

If the refracting power of the first lens group is increased and if the refracting power of the second lens group is decreased beyond the lower limit of conditional equation (2), various aberrations which occur in the first lens group increase, thus it is difficult to cancel the aberrations by the second and subsequent lens groups. Further, not only is the amount of extension of the second lens group during focusing increased, but also the lens diameter is increased as the amount of extension is increased, and the weight of the lenses is increased, which are undesirable.

If, conversely, mainly the refracting power of the second lens group is increased beyond the upper limit of conditional equation (2), the amount of extension of the lenses is decreased; however, the spherical aberration and the chromatic aberration (both of the axial color and the chromatic aberration of magnification) will vary greatly, in particular, during focusing, and it is difficult to correct these aberrations. Further, the refracting powers of the third and fourth lens groups for obtaining a desired zoom ratio are increased due to the influence of the positive refracting power of the second lens group, and it is difficult to correct the aberration variations caused by zooming, as described in conditional equation (1) described above, which is undesirable.

Although the object of the present invention can be achieved sufficiently without changing the numerical range of conditional equation (2), more preferably, the numerical range should be the following range:

$$0.8 < f_1/f_2 < 1.45 \quad (2')$$

Still more preferably, the following condition should be satisfied:

$$0.92 < f_1/f_2 < 1.4 \quad (2'')$$

It is more preferable that the value of the ratio of $f_2$ to $f_T$ be in the numerical range below as a condition for optimizing the aberration correction and the amount of extension:

$$0.65 < f_2/f_T < 1.50 \quad (3)$$

Although it is possible to sufficiently balance the aberration correction and the amount of extension in the numerical range of equation (3), more preferably, the range should be the following range:

$$0.7 < f_2/f_T < 1.2 \quad (3')$$

The zoom arrangement is desirably formed in such a way that a fixed fifth lens group having a positive refracting power is provided on the image plane side of the fourth lens group, and an afocal zooming system is formed by the first to fourth lens groups, as in the embodiment of the present invention.

The first lens group is formed of a meniscus negative lens having a greatly concaved surface on the image side, a double convex lens and a meniscus positive lens having a greatly convexed surface on the object side in this order from the object side. The second lens group is preferably formed of a meniscus negative lens having a concave surface on the image side and a positive lens whose curvature of the lens surface on the object side is greater than that of the lens surface on the image side. The third lens group is formed of a negative lens having a greatly concaved surface on the image side and a cemented lens comprising a negative and a positive lens, and a meniscus negative lens having a concave surface on the object side. The fourth lens group is formed of at least one positive lens and a meniscus negative lens having a concave surface on the object side. The fifth lens group is formed of a positive lens, a positive lens having a greatly convexed surface on the object side, a negative lens having a greatly concave surface on the image side, a positive lens, a meniscus negative lens having a concave surface on the object side, and a positive lens. Thus, excellent optical performance is maintained.

Use of a glass member with an anomalous dispersion ratio having a refractive index of about 1.5 and an abbe number of about 80 in at least one of the two positive lenses of the first lens group makes it possible to satisfactorily correct chromatic aberration. A glass member having a relatively small specific gravity and a refractive index of 1.65 or less may preferably be used as the positive lens of the second lens group, and a glass member having an abbe number of 40 or more may preferably be used by taking the correction of chromatic aberration into consideration.

Following conditional equation (3) described earlier, it is more preferable that any of conditional equations (4), (5) and (6) described below be satisfied. If the focal length of the third lens group is denoted as $f_3$, and if the value of the ratio of $f_3$ to $f_T$ is set within the range:

$$0.12 < |f_3|/f_T < 0.17 \quad (4)$$

then, various conditions, such as a zoom ratio, a total length of the lenses, or a back focus, are satisfied, and it is easy to correct aberrations satisfactorily.

If the focal length of the fourth lens group is denoted as $f_4$, and if the value of the ratio of $f_4$ to $f_T$ is set within the following range:

$$0.35 < f_4/f_T < 0.7 \quad (5)$$

then, various conditions, such as a zoom ratio, a total length of the lenses, or a back focus, are satisfied and it is easy to correct aberrations satisfactorily.

If the focal length of the fifth lens group is denoted as $f_5$, and if the value of the ratio of $f_5$ to $f_T$ is set within the following range:

$$0.3 < f_5/f_T < 0.7 \quad (6)$$

then, various conditions, such as a zoom ratio, a total length of the lenses, or a back focus, are satisfied, and it is easy to correct aberrations satisfactorily.

Next, numerical embodiments of the present invention will be described. In the numerical embodiments, reference character Ri denotes the curvature radius of the i-th lens surface sequentially from the first conjugate point; reference character Di denotes the thickness of the i-th lens and an air gap from the first conjugate point; reference characters Ni and vi denote a refractive index of glass of the i-th lens from the conjugate point and its abbe number, respectively, sequentially from the first conjugate point.

The relation between each of the above-described conditional equations and the numerical values in the numerical embodiments is shown in Table 1.

In the aberration figures, (A) shows a figure with respect to an object at infinity, and (B) shows a figure when the zoom lens is focused on an object at a distance of 1.5 m.

First Numerical Embodiment fno = 1:2.923    f = 72.10~194.01

| | | | |
|---|---|---|---|
| r1 = 311.919 | d1 = 2.80 | n1 = 1.74950 | v1 = 35.0 |
| r2 = 118.630 | d2 = 0.42 | | |
| r3 = 128.135 | d3 = 8.68 | n2 = 1.49700 | v2 = 81.6 |
| r4 = −263.474 | d4 = 0.10 | | |
| r5 = 79.501 | d5 = 5.72 | n3 = 1.49700 | v3 = 81.6 |
| r6 = 203.191 | d6 = VARIABLE | | |
| r7 = 54.391 | d7 = 2.20 | n4 = 1.84666 | v4 = 23.8 |
| r8 = 45.859 | d8 = 1.13 | | |
| r9 = 51.927 | d9 = 8.55 | n5 = 1.48749 | v5 = 70.2 |
| r10 = 5099.296 | d10 = VARIABLE | | |
| r11 = −488.600 | d11 = 1.40 | n6 = 1.80400 | v6 = 46.6 |
| r12 = 35.390 | d12 = 5.88 | | |
| r13 = −78.125 | d13 = 1.40 | n7 = 1.48749 | v7 = 70.2 |
| r14 = 38.137 | d14 = 4.97 | n8 = 1.84666 | v8 = 23.9 |
| r15 = 417.478 | d15 = 2.65 | | |
| r16 = −66.802 | d16 = 1.40 | n9 = 1.72916 | v9 = 54.7 |
| r17 = −3362.971 | d17 = VARIABLE | | |
| r18 = 247.120 | d18 = 3.49 | n10 = 1.69680 | v10 = 55.5 |
| r19 = −99.902 | d19 = 0.15 | | |
| r20 = −189.999 | d20 = 4.77 | n11 = 1.49700 | v11 = 81.6 |
| r21 = −40.553 | d21 = 1.45 | n12 = 1.83400 | v12 = 37.2 |
| r22 = −76.277 | d22 = VARIABLE | | |
| r23 = 58.421 | d23 = 3.53 | n13 = 1.80400 | v13 = 46.6 |
| r24 = 133.262 | d24 = 3.00 | | |
| r25 = (ABERRATION) | d25 = 0.24 | | |
| r26 = 34.132 | d26 = 6.35 | n14 = 1.49700 | v14 = 81.6 |
| r27 = 2256.763 | d27 = 3.72 | n15 = 1.62004 | v15 = 36.3 |
| r28 = 31.519 | d28 = 28.17 | | |
| r29 = 132.947 | d29 = 5.90 | n16 = 1.51742 | v16 = 52.4 |
| r30 = −77.546 | d30 = 13.94 | | |
| r31 = −39.485 | d31 = 1.80 | n17 = 1.83400 | v17 = 37.2 |
| r32 = −95.683 | d32 = 0.15 | | |
| r33 = 147.644 | d33 = 3.62 | n18 = 1.74320 | v18 = 49.3 |
| r34 = −205.762 | | | |

| VARIABLE DISTANCE | FOCAL LENGTH | | |
|---|---|---|---|
| | 72.10 | 135.00 | 194.01 |
| d6 | 8.78 | 26.15 | 32.85 |
| d10 | 1.64 | 12.89 | 17.23 |
| d17 | 30.32 | 15.72 | 1.32 |
| d22 | 14.70 | 0.69 | 4.05 |

Second Numerical Embodiment fno = 1:2.924    f = 72.10~93.90

| | | | |
|---|---|---|---|
| r1 = 225.542 | d1 = 2.5 | n1 = 1.74950 | v1 = 35.0 |
| r2 = 104.642 | d2 = 0.28 | | |
| r3 = 108.610 | d3 = 9.27 | n2 = 1.49700 | v2 = 81.6 |
| r4 = −265.354 | d4 = 0.10 | | |
| r5 = 75.092 | d5 = 4.70 | n3 = 1.49700 | v3 = 81.6 |
| r6 = 140.045 | d6 = VARIABLE | | |
| r7 = 59.544 | d7 = 1.60 | n4 = 1.84666 | v4 = 23.8 |
| r8 = 49.090 | d8 = 0.99 | | |
| r9 = 54.762 | d9 = 7.79 | n5 = 1.52542 | v5 = 64.6 |
| r10 = 1743.971 | d10 = VARIABLE | | |
| r11 = −530.206 | d11 = 1.40 | n6 = 1.83481 | v6 = 42.7 |
| r12 = 37.558 | d12 = 5.68 | | |
| r13 = −79.170 | d13 = 1.40 | n7 = 1.48749 | v7 = 70.2 |
| r14 = 40.477 | d14 = 5.04 | n8 = 1.84666 | v8 = 23.9 |
| r15 = 2687.975 | d15 = 2.31 | | |
| r16 = −69.555 | d16 = 1.40 | n9 = 1.71300 | v9 = 53.8 |
| r17 = −2323.188 | d17 = VARIABLE | | |
| r18 = 221.017 | d18 = 3.19 | n10 = 1.60311 | v10 = 60.7 |
| r19 = −138.222 | d19 = 0.15 | | |
| r20 = 1868.115 | d20 = 5.61 | n11 = 1.49700 | v11 = 81.6 |
| r21 = −44.515 | d21 = 1.40 | n12 = 1.83400 | v12 = 37.2 |
| r22 = −84.287 | d22 = VARIABLE | | |
| r23 = 50.371 | d23 = 3.37 | n13 = 1.78800 | v13 = 47.4 |
| r24 = 96.720 | d24 = 3.40 | | |
| r25 = (ABERRATION) | d25 = 7.83 | | |
| r26 = 35.719 | d26 = 6.29 | n14 = 1.49700 | v14 = 81.6 |
| r27 = 364.987 | d27 = 0.18 | | |
| r28 = 426.065 | d28 = 4.23 | n15 = 1.64769 | v15 = 33.8 |
| r29 = 30.169 | d29 = 18.38 | | |
| r30 = 564.115 | d30 = 3.70 | n16 = 1.62374 | v16 = 47.1 |
| r31 = −75.863 | d31 = 14.24 | | |
| r32 = −41.096 | d32 = 1.80 | n17 = 1.83400 | v17 = 37.2 |
| r33 = −79.119 | d33 = 0.15 | | |
| r34 = 88.271 | d34 = 3.22 | n18 = 1.83481 | v18 = 42.7 |
| r35 = 631.452 | | | |

| VARIABLE DISTANCE | FOCAL LENGTH | | |
|---|---|---|---|
| | 72.10 | 135.00 | 193.90 |
| d6 | 8.62 | 26.51 | 33.11 |
| d10 | 1.50 | 12.82 | 17.00 |
| d17 | 36.70 | 18.29 | 1.03 |
| d22 | 12.22 | 1.42 | 7.90 |

Third Numerical Embodiment fno = 1:2.923    f = 72.10~194.01

| | | | |
|---|---|---|---|
| r1 = 276.573 | d1 = 2.80 | n1 = 1.74950 | v1 = 35.0 |
| r2 = 113.188 | d2 = 0.31 | | |
| r3 = 118.700 | d3 = 9.18 | n2 = 1.49700 | v2 = 81.6 |
| r4 = −248.684 | d4 = 0.10 | | |
| r5 = 79.217 | d5 = 5.61 | n3 = 1.49700 | v3 = 81.6 |
| r6 = 189.619 | d6 = VARIABLE | | |
| r7 = 58.290 | d7 = 2.20 | n4 = 1.84666 | v4 = 23.8 |
| r8 = 48.706 | d8 = 0.89 | | |
| r9 = 53.632 | d9 = 8.16 | n5 = 1.48749 | v5 = 70.2 |
| r10 = 1473.054 | d10 = VARIABLE | | |
| r11 = −456.797 | d11 = 1.40 | n6 = 1.80400 | v6 = 46.6 |
| r12 = 35.948 | d12 = 5.74 | | |
| r13 = −77.752 | d13 = 1.40 | n7 = 1.48749 | v7 = 70.2 |
| r14 = 38.943 | d14 = 4.96 | n8 = 1.84666 | v8 = 23.9 |
| r15 = 458.710 | d15 = 2.51 | | |
| r16 = −68.075 | d16 = 1.40 | n9 = 1.72916 | v9 = 54.7 |
| r17 = −1027.347 | d17 = VARIABLE | | |
| r18 = 226.746 | d18 = 3.51 | n10 = 1.69680 | v10 = 55.5 |
| r19 = −104.460 | d19 = 0.15 | | |
| r20 = −255.232 | d20 = 4.86 | n11 = 1.49700 | v11 = 81.6 |
| r21 = −42.121 | d21 = 1.45 | n12 = 1.83400 | v12 = 37.2 |
| r22 = −84.183 | d22 = VARIABLE | | |
| r23 = 56.799 | d23 = 4.04 | n13 = 1.80400 | v13 = 46.6 |
| r24 = 117.472 | d24 = 3.14 | | |
| r25 = (ABERRATION) | d25 = 0.23 | | |
| r26 = 33.786 | d26 = 6.02 | n14 = 1.49700 | v14 = 81.6 |
| r27 = 647.995 | d27 = 5.02 | n15 = 1.62004 | v15 = 36.3 |
| r28 = 30.401 | d28 = 26.69 | | |
| r29 = 140.183 | d29 = 5.85 | n16 = 1.51742 | v16 = 52.4 |
| r30 = −75.171 | d30 = 13.54 | | |
| r31 = −39.511 | d31 = 1.80 | n17 = 1.83400 | v17 = 37.2 |
| r32 = −87.264 | d32 = 0.15 | | |
| r33 = 110.673 | d33 = 3.51 | n18 = 1.74320 | v18 = 49.3 |
| r34 = −540.841 | | | |

| VARIABLE DISTANCE | FOCAL LENGTH | | |
|---|---|---|---|
| | 72.10 | 135.00 | 194.01 |
| d6 | 8.68 | 25.94 | 32.52 |

| | | | |
|---|---|---|---|
| d10 | 1.50 | 12.69 | 16.94 |
| d17 | 32.17 | 16.61 | 1.44 |
| d22 | 13.54 | 0.65 | 4.98 |

Fourth Numerical Embodiment fno = :2.923     f = 72.10~193.26

| | | | |
|---|---|---|---|
| r1 = 110.141 | d1 = 2.50 | n1 = 1.84666 | v1 = 23.8 |
| r2 = 87.208 | d2 = 0.69 | | |
| r3 = 95.385 | d3 = 8.75 | n2 = 1.49700 | v2 = 81.6 |
| r4 = −590.187 | d4 = 0.10 | | |
| r5 = 82.563 | d5 = 3.72 | n3 = 1.49700 | v3 = 81.6 |
| r6 = 127.384 | d6 = VARIABLE | | |
| r7 = 71.160 | d7 = 1.60 | n4 = 1.84666 | v4 = 23.8 |
| r8 = 56.304 | d8 = 0.55 | | |
| r9 = 60.948 | d9 = 6.52 | n5 = 1.55232 | v5 = 63.8 |
| r10 = 593.939 | d10 = VARIABLE | | |
| r11 = −592.481 | d11 = 1.40 | n6 = 1.88300 | v6 = 40.8 |
| r12 = 35.493 | d12 = 5.60 | | |
| r13 = −65.813 | d13 = 1.40 | n7 = 1.49700 | v7 = 81.6 |
| r14 = 38.705 | d14 = 5.23 | n8 = 1.84666 | v8 = 23.8 |
| r15 = −796.747 | d15 = 2.24 | | |
| r16 = −61.323 | d16 = 1.40 | n9 = 1.71300 | v9 = 53.8 |
| r17 = −1138.043 | d17 = VARIABLE | | |
| r18 = 199.355 | d18 = 3.67 | n10 = 1.63854 | v10 = 55.4 |
| r19 = −103.069 | d19 = 0.15 | | |
| r20 = −908.853 | d20 = 5.79 | n11 = 1.49700 | v11 = 81.6 |
| r21 = −39.561 | d21 = 1.40 | n12 = 1.85026 | v12 = 32.3 |
| r22 = −73.502 | d22 = VARIABLE | | |
| r23 = 89.528 | d23 = 2.91 | n13 = 1.78300 | v13 = 36.2 |
| r24 = 273.169 | d24 = 2.00 | | |
| r25 = (ABERRATION) | d25 = 0.50 | | |
| r26 = 41.342 | d26 = 8.60 | n14 = 1.49700 | v14 = 81.6 |
| r27 = −657.295 | d27 = 0.58 | | |
| r28 = −280.406 | d28 = 5.30 | n15 = 1.65446 | v15 = 33.6 |
| r29 = 42.786 | d29 = 25.54 | | |
| r30 = 155.211 | d30 = 5.70 | n16 = 1.61272 | v16 = 58.8 |
| r31 = −66.167 | d31 = 18.25 | | |
| r32 = −39.523 | d32 = 1.80 | n17 = 1.86403 | v17 = 37.2 |
| r33 = −94.718 | d33 = 0.42 | | |
| r34 = 96.052 | d34 = 2.86 | n18 = 1.86300 | v18 = 41.5 |
| r35 = 363.586 | | | |

| VARIABLE | FOCAL LENGTH | | |
|---|---|---|---|
| DISTANCE | 72.10 | 135.00 | 193.26 |
| d6 | 11.32 | 25.51 | 30.81 |
| d10 | 1.50 | 15.65 | 20.94 |
| d17 | 25.22 | 12.92 | 1.17 |
| d22 | 17.25 | 1.21 | 2.37 |

Fifth Numerical Embodiment fno = 1:2.94     f = 72.10–203.51

| | | | |
|---|---|---|---|
| r1 = 171.950 | d1 = 3.00 | n1 = 1.80518 | v1 = 25.4 |
| r2 = 115.156 | d2 = 0.13 | | |
| r3 = 121.598 | d3 = 7.97 | n2 = 1.49700 | v2 = 81.6 |
| r4 = −407.029 | d4 = 0.10 | | |
| r5 = 99.019 | d5 = 4.62 | n3 = 1.49700 | v3 = 81.6 |
| r6 = 216.142 | d6 = VARIABLE | | |
| r7 = 84.581 | d7 = 1.30 | n4 = 1.84666 | v4 = 23.8 |
| r8 = 59.833 | d8 = 7.16 | n5 = 1.62012 | v5 = 49.5 |
| r9 = 456.702 | d9 = VARIABLE | | |
| r10 = 1538.228 | d10 = 1.40 | n6 = 1.80400 | v6 = 46.6 |
| r11 = 37.318 | d11 = 4.99 | | |
| r12 = −131.265 | d12 = 1.40 | n7 = 1.58913 | v7 = 61.2 |
| r13 = 35.604 | d13 = 5.33 | n8 = 1.84666 | v8 = 23.9 |
| r14 = 455.335 | d14 = 3.00 | | |
| r15 = −50.362 | d15 = 1.40 | n9 = 1.69680 | v9 = 55.5 |
| r16 = −418.859 | d16 = VARIABLE | | |
| r17 = 188.059 | d17 = 7.62 | n10 = 1.49700 | v10 = 81.6 |
| r18 = −34.077 | d18 = 1.40 | n11 = 1.83400 | v11 = 37.2 |
| r19 = −52.306 | d19 = VARIABLE | | |
| r20 = (ABERRATION) | d20 = 1.00 | | |
| r21 = 57.806 | d21 = 4.65 | n12 = 1.49700 | v12 = 81.6 |
| r22 = −1836.788 | d22 = 0.14 | | |
| r23 = 32.883 | d23 = 7.26 | n13 = 1.49700 | v13 = 81.6 |
| r24 = 102.468 | d24 = 7.85 | | |
| r25 = −371.499 | d25 = 2.00 | n14 = 1.60342 | v14 = 38.0 |
| r26 = 36.388 | d26 = 23.04 | | |
| r27 = 167.965 | d27 = 6.96 | n15 = 1.54814 | v15 = 45.8 |
| r28 = −39.615 | d28 = 6.98 | | |
| r29 = −28.542 | d29 = 1.80 | n16 = 1.83400 | v16 = 37.2 |
| r30 = −78.734 | d30 = 0.42 | | |
| r31 = 61.694 | d31 = 5.97 | n17 = 1.77250 | v17 = 49.6 |
| r32 = 244.286 | | | |

| VARIABLE | FOCAL LENGTH | | |
|---|---|---|---|
| DISTANCE | 72.10 | 135.00 | 203.51 |
| d6 | 12.13 | 29.14 | 36.75 |
| d9 | 1.12 | 14.90 | 21.07 |
| d16 | 25.33 | 14.53 | 0.51 |
| d19 | 21.07 | 1.09 | 1.33 |

Sixth Numerical Embodiment fno = 1:2.923     f = 72.10–94.01

| | | | |
|---|---|---|---|
| r1 = 355.855 | d1 = 2.80 | n1 = 1.74950 | v1 = 35.0 |
| r2 = 121.211 | d2 = 0.42 | | |
| r3 = 131.256 | d3 = 8.62 | n2 = 1.49700 | v2 = 81.6 |
| r4 = −259.209 | d4 = 0.10 | | |
| r5 = 80.584 | d5 = 6.01 | n3 = 1.49700 | v3 = 81.6 |
| r6 = 234.800 | d6 = VARIABLE | | |
| r7 = 51.450 | d7 = 2.20 | n4 = 1.84666 | v4 = 23.8 |
| r8 = 43.769 | d8 = 1.28 | | |
| r9 = 49.946 | d9 = 8.87 | n5 = 1.48749 | v5 = 70.2 |
| r10 = 12148.909 | d10 = VARIABLE | | |
| r11 = −600.368 | d11 = 1.40 | n6 = 1.80400 | v6 = 46.6 |
| r12 = 34.801 | d12 = 5.98 | | |
| r13 = −75.966 | d13 = 1.40 | n7 = 1.48749 | v7 = 70.2 |
| r14 = 37.777 | d14 = 4.97 | n8 = 1.84666 | v8 = 23.9 |
| r15 = 413.301 | d15 = 2.64 | | |
| r16 = −66.400 | d16 = 1.40 | n9 = 1.72916 | v9 = 54.7 |
| r17 = 3021.469 | d17 = VARIABLE | | |
| r18 = 230.258 | d18 = 3.51 | n10 = 1.69680 | v10 = 55.5 |
| r19 = −98.917 | d19 = 0.15 | | |
| r20 = −172.378 | d20 = 4.66 | n11 = 1.49700 | v11 = 81.6 |
| r21 = −40.226 | d21 = 1.45 | n12 = 1.83400 | v12 = 37.2 |
| r22 = −76.185 | d22 = VARIABLE | | |
| r23 = 57.653 | d23 = 3.73 | n13 = 1.80400 | v13 = 46.6 |
| r24 = 128.671 | d24 = 3.05 | | |
| r25 = (ABERRATION) | d25 = 0.34 | | |
| r26 = 33.882 | d26 = 6.26 | n14 = 1.49700 | v14 = 81.6 |
| r27 = 1455.342 | d27 = 3.99 | n15 = 1.62004 | v15 = 36.3 |
| r28 = 31.129 | d28 = 26.85 | | |
| r29 = 117.922 | d29 = 5.91 | n16 = 1.51742 | v16 = 52.4 |
| r30 = −81.244 | d30 = 14.02 | | |
| r31 = −38.692 | d31 = 1.80 | n17 = 1.83400 | v17 = 37.2 |
| r32 = −102.301 | d32 = 0.15 | | |
| r33 = 183.092 | d33 = 3.91 | n18 = 1.74320 | v18 = 49.3 |
| r34 = −129.948 | | | |

-continued

| VARIABLE | FOCAL LENGTH | | |
|---|---|---|---|
| DISTANCE | 72.10 | 135.00 | 194.01 |
| d6 | 8.69 | 26.10 | 32.84 |
| d10 | 1.57 | 12.05 | 16.10 |
| d17 | 30.32 | 15.57 | 0.97 |
| d22 | 13.86 | 0.71 | 4.52 |

TABLE 1

| | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|
| $m_2/f_T$ | 0.124 | 0.126 | 0.123 | 0.101 | 0.121 | 0.124 |
| $f_1/f_2$ | 1.150 | 1.112 | 1.015 | 0.821 | 0.862 | 1.225 |
| $f_2/f_T$ | 0.781 | 0.806 | 0.848 | 1.014 | 0.995 | 0.731 |
| $f_3/f_T$ | −0.140 | −0.154 | −0.145 | −0.138 | −0.140 | −0.137 |
| $f_4/f_T$ | 0.531 | 0.538 | 0.536 | 0.456 | 0.565 | 0.533 |
| $f_5/f_T$ | 0.483 | 0.542 | 0.495 | 0.495 | 0.414 | 0.476 |

As has been described up to this point, by defining the movement of the second lens group so as to satisfy conditional equation (1) described earlier, the diameter of the second lens group can be decreased and focusing can be made speedier. In addition, by defining the focal lengths of the first and second lens groups so as to satisfy conditional equation (2), it is possible to provide an excellent zoom lens free from aberration.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation so as to encompass all such modifications, equivalent structures and functions.

What is claimed is:

1. A zoom lens comprising at least a first lens group having a positive refracting power, a second lens group having a positive refracting power, and a third lens group having a negative refracting power in this order from an object side to an image side, wherein zooming from a wide angle end to a telephoto end is performed by moving said second and third lens groups toward the image side at different speeds, focusing is performed by moving said second lens group, and the following condition is satisfied:

$$0.025 < m_2/f_T < 0.135 \ (m_2 > 0)$$

where $f_T$ is the focal length at the telephoto end of the entire system, and $m_2$ is the amount of zoom movement of said second lens group from the wide angle end to the telephoto end.

2. A zoom lens according to claim 1, wherein the focal lengths of said first and second lens groups are denoted as $f_1$ and $f_2$, respectively, and the following condition is satisfied:

$$0.75 < f_1/f_2 < 1.50.$$

3. A zoom lens according to claim 1, further comprising a fourth lens group adjacent said third lens group having a positive refracting power, and a fifth lens group adjacent said fourth lens group having a positive refracting power, wherein an afocal zooming system is formed by said first to fourth lens groups, and said fifth lens group is fixed during zooming.

4. A zoom lens according to claim 3, wherein the following relation is satisfied:

$$0.65 < f_2/f_T < 1.50$$

wherein $f_2$ is the focal lenth of said second lens group.

5. A zoom lens according to claim 3, wherein said first lens group has a meniscus negative lens having a greatly concaved surface on the image side, a double convex lens, and a meniscus positive lens having a greatly convexed surface on the object side in this order from the object side toward the image side, and said second lens group has a meniscus negative lens having a concave surface on the image side and a positive lens whose curvature of a lens surface on the object side is greater than that of a lens surface on the image side.

* * * * *

UNITED STATES PATENT AND TRADEMARK OFFICE
CERTIFICATE OF CORRECTION

PATENT NO. : 5,537,259　　　　　　　　　Page 1 of 3
DATED : July 16, 1996
INVENTOR(S) : HIDEKI OGAWA It is certified that error appears in the above-indentified patent and that said Letters Patent is hereby corrected as shown below:

Title page:
item [56] FOREIGN PATENT DOCUMENTS:

"4338910" should read --4-338910--.

COLUMN 1:

Line 16, "but also" should read --but so also is--; and
Line 56, "lessen" should read --to lessen--.

COLUMN 2:

Line 65, "8(A) and 8(B)" should read --8(A)(1)-8(A)(4) and 8(B)(1)-8(B)(4)--.

COLUMN 3:

Line 1, "9(A) and 9(B)" should read --9(A)(1)-(A)(4) and 9(B)(1)-(B)(4)--;
Line 4, "10(A) and 10(B)" should read --10(A)(1)-(A)(4) and 10(B)(1)-(B)(4)--;
Line 7, "11(A) and 11(B)" should read --11(A)(1)-(A)(4) and 11(B)(1)-(B)(4)--;
Line 10, "12(A) and 12(B)" should read --12(A)(1)-(A)(4) and 12(B)(1)-(B)(4)--;
Line 13, "13(A) and 13(B)" should read --13(A)(1)-(A)(4) and 13(B)(1)-(B)(4)--;
Line 17, "14(A) and 14(B)" should read --14(A)(1)-(A)(4) and 14(B)(1)-(B)(4)--;
Line 20, "15(A) and 15(B)" should read --15(A)(1)-(A)(4) and 15(B)(1)-(B)(4)--;

UNITED STATES PATENT AND TRADEMARK OFFICE
CERTIFICATE OF CORRECTION

PATENT NO. : 5,537,259　　　　　　　　Page 2 of 3
DATED : July 16, 1996
INVENTOR(S) : HIDEKI OGAWA It is certified that error appears in the above-indentified patent and that said Letters Patent is hereby corrected as shown below:

```
Line 23,  "16(A) and 16(B)" should read --16(A)(1)-(A)(4)
     and 16(B)(1)-(B)(4)--;
Line 26,  "17(A) and 17(B)" should read --17(A)(1)-(A)(4)
     and 17(B)(1)-(B)(4)--;
Line 29,  "18(A) and 18(B)" should read --18(A)(1)-(A)(4)
     and 18(B)(1)-(B)(4)--;
Line 33,  "19(A) and 19(B)" should read --19(A)(1)-(A)(4)
     and 19(B)(1)-(B)(4)--;
Line 36,  "20(A) and 20(B)" should read --20(A)(1)-(A)(4)
     and 20(B)(1)-(B)(4)--;
Line 39,  "21(A) and 21(B)" should read --21(A)(1)-(A)(4)
     and 21(B)(1)-(B)(4)--;
Line 42,  "22(A) and 22(B)" should read --22(A)(1)-(A)(4)
     and 22(B)(1)-(B)(4)--;
Line 46,  "23(A) and 23(B)" should read --23(A)(1)-(A)(4)
     and 23(B)(1)-(B)(4)--;
Line 49,  "24(A) and 24(B)" should read --24(A)(1)-(A)(4)
     and 24(B)(1)-(B)(4)--; and
Line 52,  "25(A) and 25(B)" should read --25(A)(1)-(A)(4)
     and 25(B)(1)-(B)(4)--.
```

COLUMN 4:

Line 65, "it" should read --then it--.

COLUMN 6:

Line 54, "Ri" should read --ri--;
Line 56, "Di" should read --di--;

UNITED STATES PATENT AND TRADEMARK OFFICE
CERTIFICATE OF CORRECTION

PATENT NO. : 5,537,259
DATED : July 16, 1996
INVENTOR(S) : HIDEKI OGAWA

It is certified that error appears in the above-indentified patent and that said Letters Patent is hereby corrected as shown below:

```
Line 57, "Ni" should read --ni--;
Line 65, "(A)" should read --(A)(i.e., (A)(1)-(A)(4))--;
and
Line 66, "(B)" should read --(B)(i.e., (B)(1)-(B)(4))--.

COLUMN 7:

Line 48, "f=72.10~93.90" should read --f=72.10~193.90--.

COLUMN 9:

Line 9, "fno=:2.923" should read --fno=1:2.923--.

COLUMN 10:

Line 33, "f=72.10~94.01" should read --f=72.10~194.01--;

COLUMN 12:

Line 36, "lenth" should read --length--.
```

Signed and Sealed this

First Day of July, 1997

BRUCE LEHMAN

*Attest:*

*Attesting Officer*   *Commissioner of Patents and Trademarks*